US012620038B2

(12) United States Patent
Yagi

(10) Patent No.: US 12,620,038 B2
(45) Date of Patent: May 5, 2026

(54) CROP MANAGEMENT SYSTEM

(71) Applicant: SoftBank Group Corp., Tokyo (JP)

(72) Inventor: Mikio Yagi, Tokyo (JP)

(73) Assignee: SoftBank Group Corp., Tokyo (JP)

( * ) Notice: Subject to any disclaimer, the term of this patent is extended or adjusted under 35 U.S.C. 154(b) by 0 days.

(21) Appl. No.: 19/314,874

(22) Filed: Aug. 29, 2025

(65) Prior Publication Data

US 2026/0073456 A1     Mar. 12, 2026

(30) Foreign Application Priority Data

Sep. 10, 2024     (JP) ................................. 2024-156208

(51) Int. Cl.
*G06Q 10/063*     (2023.01)
*G06Q 50/02*     (2024.01)

(52) U.S. Cl.
CPC ........... *G06Q 50/02* (2013.01); *G06Q 10/063* (2013.01)

(58) Field of Classification Search
None
See application file for complete search history.

(56) References Cited

U.S. PATENT DOCUMENTS

| | | | |
|---|---|---|---|
| 2006/0174291 A1* | 8/2006 | Takai ................... | H04N 5/9201 386/E5.028 |
| 2007/0150871 A1* | 6/2007 | Barsness ............. | G06F 11/3616 717/128 |
| 2007/0208511 A1* | 9/2007 | Glenn ..................... | A01G 7/00 702/19 |
| 2012/0123817 A1* | 5/2012 | Hohenberger ..... | G06Q 10/0631 705/7.12 |
| 2014/0035752 A1* | 2/2014 | Johnson ............... | A01B 79/005 340/601 |
| 2015/0309496 A1* | 10/2015 | Kah, III ............. | G05B 19/0426 700/284 |
| 2016/0364577 A1* | 12/2016 | Williams ........... | G06F 21/6245 |
| 2018/0181080 A1* | 6/2018 | Imamura ................ | H04W 4/02 |
| 2019/0222652 A1* | 7/2019 | Graefe ................... | H04L 67/12 |
| 2020/0150752 A1* | 5/2020 | Kuntagod ............... | G06N 3/09 |
| 2021/0136996 A1* | 5/2021 | Ben-Ner ............... | G06Q 10/04 |
| 2023/0076104 A1* | 3/2023 | Hazell ................. | G06Q 10/063 |

FOREIGN PATENT DOCUMENTS

JP       2022-180282  A     12/2022

* cited by examiner

*Primary Examiner* — Folashade Anderson
(74) *Attorney, Agent, or Firm* — Rimon P.C.

(57)     ABSTRACT

A system according to embodiments comprises a collection unit, a management unit, an analysis unit, and a provision unit. The collection unit collects data. The management unit centrally manages the data collected by the collection unit. The analysis unit analyzes the data managed by the management unit. The provision unit provides advice based on the analysis results obtained by the analysis unit.

13 Claims, 10 Drawing Sheets

CROP MANAGEMENT SYSTEM

CROSS-REFERENCE TO RELATED APPLICATION

The present application claims priority to and incorporates by reference the entire contents of Japanese Patent Application No. 2024-156208 filed in Japan on Sep. 10, 2024.

BACKGROUND OF THE INVENTION

Field of the Invention

The technology of this disclosure relates to a system.

Description of the Related Art

Japanese Patent Application Laid-open No. 2022-180282 discloses a persona chatbot control method executed by at least one processor, comprising: receiving a user utterance, adding the user utterance to a prompt containing instructions related to the character of the chatbot, encoding the prompt, inputting the encoded prompt into a language model, and generating a chatbot utterance in response to the user utterance.

In conventional technology, there has been a problem in that real-time monitoring of farm conditions, centralized management of data, and provision of appropriate advice based on analysis results have not been sufficiently achieved.

SUMMARY OF THE INVENTION

The system according to the embodiment comprises a collection unit, a management unit, an analysis unit, and a provision unit. The collection unit collects data. The management unit centrally manages the data collected by the collection unit. The analysis unit analyzes the data managed by the management unit. The provision unit provides advice based on the analysis results obtained by the analysis unit.

DETAILED DESCRIPTION OF THE PREFERRED EMBODIMENTS

Hereinafter, an example of an embodiment of the system related to the technology disclosed herein will be described with reference to the attached drawings.

First, the terminology used in the following description will be explained.

In the following embodiments, a processor with a sign (hereinafter simply referred to as "processor") may be a single computing device or a combination of multiple computing devices. The processor may be a single type of computing device or a combination of multiple types of computing devices. Examples of computing devices include a CPU (Central Processing Unit), GPU (Graphics Processing Unit), GPGPU (General-Purpose computing on Graphics Processing Units), APU (Accelerated Processing Unit), or TPU (Tensor Processing Unit), among others.

In the following embodiments, a RAM (Random Access Memory) with a sign is a memory where information is temporarily stored and used as a work memory by the processor.

In the following embodiments, a storage with a sign is one or more non-volatile storage devices for storing various programs and parameters. Examples of non-volatile storage devices include flash memory (SSD (Solid State Drive)), magnetic disks (e.g., hard disks), or magnetic tapes, among others.

In the following embodiments, a communication I/F (Interface) with a sign is an interface including a communication processor and an antenna, among others. The communication I/F manages communication between multiple computers. Examples of communication standards applicable to the communication I/F include wireless communication standards such as 5G (5th Generation Mobile Communication System), Wi-Fi (registered trademark), or Bluetooth (registered trademark), among others.

In the following embodiments, "A and/or B" means "at least one of A and B." In other words, "A and/or B" means it may be only A, only B, or a combination of A and B. Moreover, when expressing three or more items connected by "and/or," the same concept as "A and/or B" applies.

First Embodiment

Figure 1:
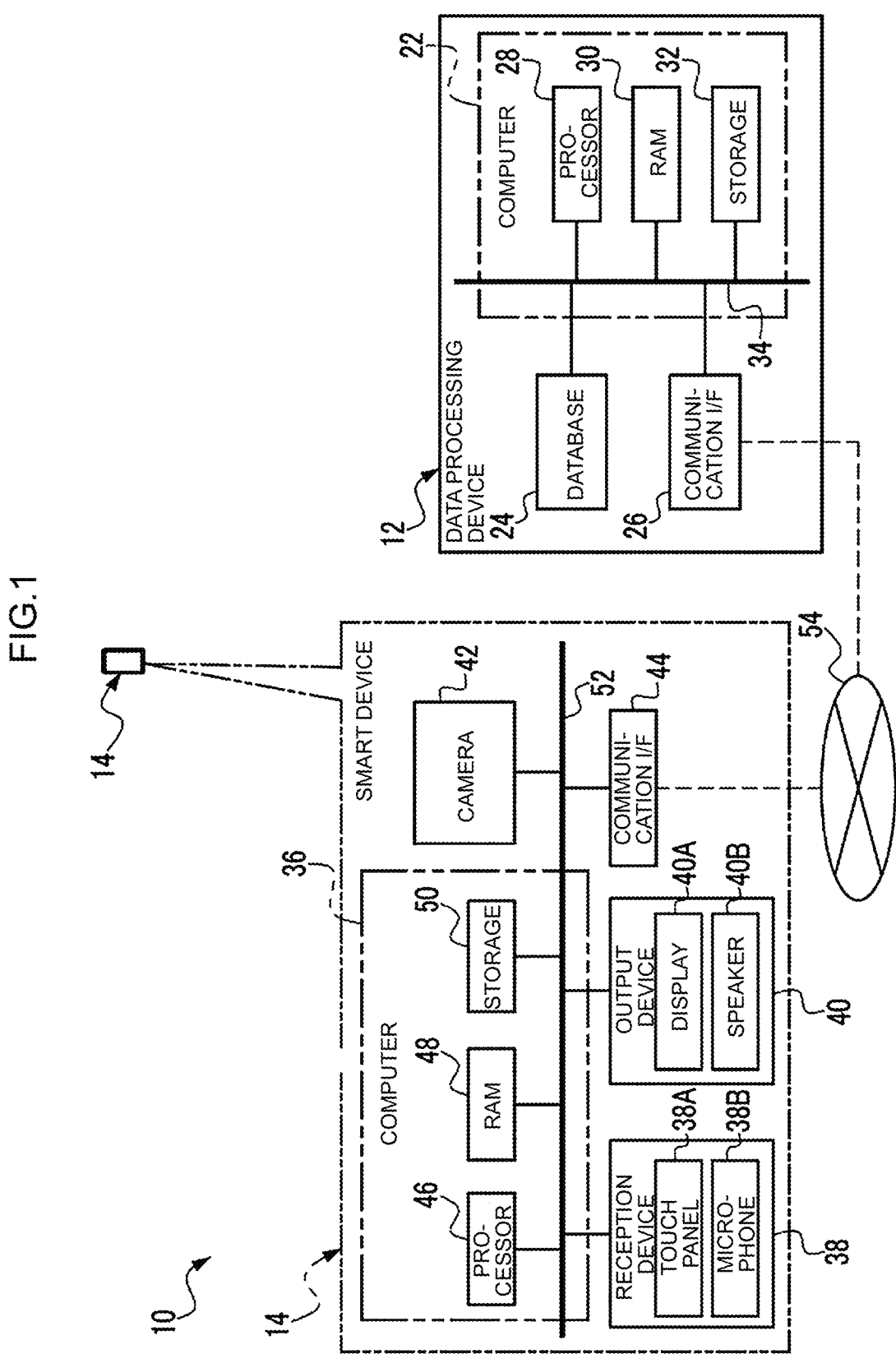
FIG. 1 is a conceptual diagram showing an example configuration of a data processing system according to the first embodiment.

FIG. 1 shows an example configuration of a data processing system 10 according to the first embodiment.

As shown in FIG. 1, the data processing system 10 comprises a data processing device 12 and a smart device 14. An example of the data processing device 12 is a server.

The data processing device 12 comprises a computer 22, a database 24, and a communication I/F 26. The computer 22 comprises a processor 28, RAM 30, and storage 32. The processor 28, RAM 30, and storage 32 are connected to a bus 34. Additionally, the database 24 and communication I/F 26 are also connected to the bus 34. The communication I/F 26 is connected to a network 54. Examples of the network 54 include a WAN (Wide Area Network) and/or a LAN (Local Area Network), among others.

The smart device 14 comprises a computer 36, a reception device 38, an output device 40, a camera 42, and a communication I/F 44. The computer 36 comprises a processor 46, RAM 48, and storage 50. The processor 46, RAM 48, and storage 50 are connected to a bus 52. The reception device 38, output device 40, and camera 42 are also connected to the bus 52.

The reception device 38 comprises a touch panel 38A and a microphone 38B, among others, and accepts user input. The touch panel 38A accepts user input by detecting contact from an indicating object (e.g., a pen or finger). The microphone 38B accepts user input by detecting the user's voice. The control unit 46A sends data indicating user input accepted by the touch panel 38A and microphone 38B to the data processing device 12. The data processing device 12 has a specific processing unit 290 (see FIG. 2) that acquires data indicating user input.

The output device 40 comprises a display 40A and a speaker 40B, among others, and presents data to the user by outputting it in a perceptible form (e.g., audio and/or text). The display 40A displays visible information such as text and images according to instructions from the processor 46. The speaker 40B outputs audio according to instructions from the processor 46. The camera 42 is a small digital camera equipped with optical systems such as lenses, apertures, and shutters, as well as imaging elements such as CMOS (Complementary Metal-Oxide-Semiconductor) image sensors or CCD (Charge Coupled Device) image sensors.

The communication I/F 44 is connected to the network 54. The communication I/F 44 and 26 manage the exchange of various information between the processor 46 and the processor 28 via the network 54.

Figure 2:
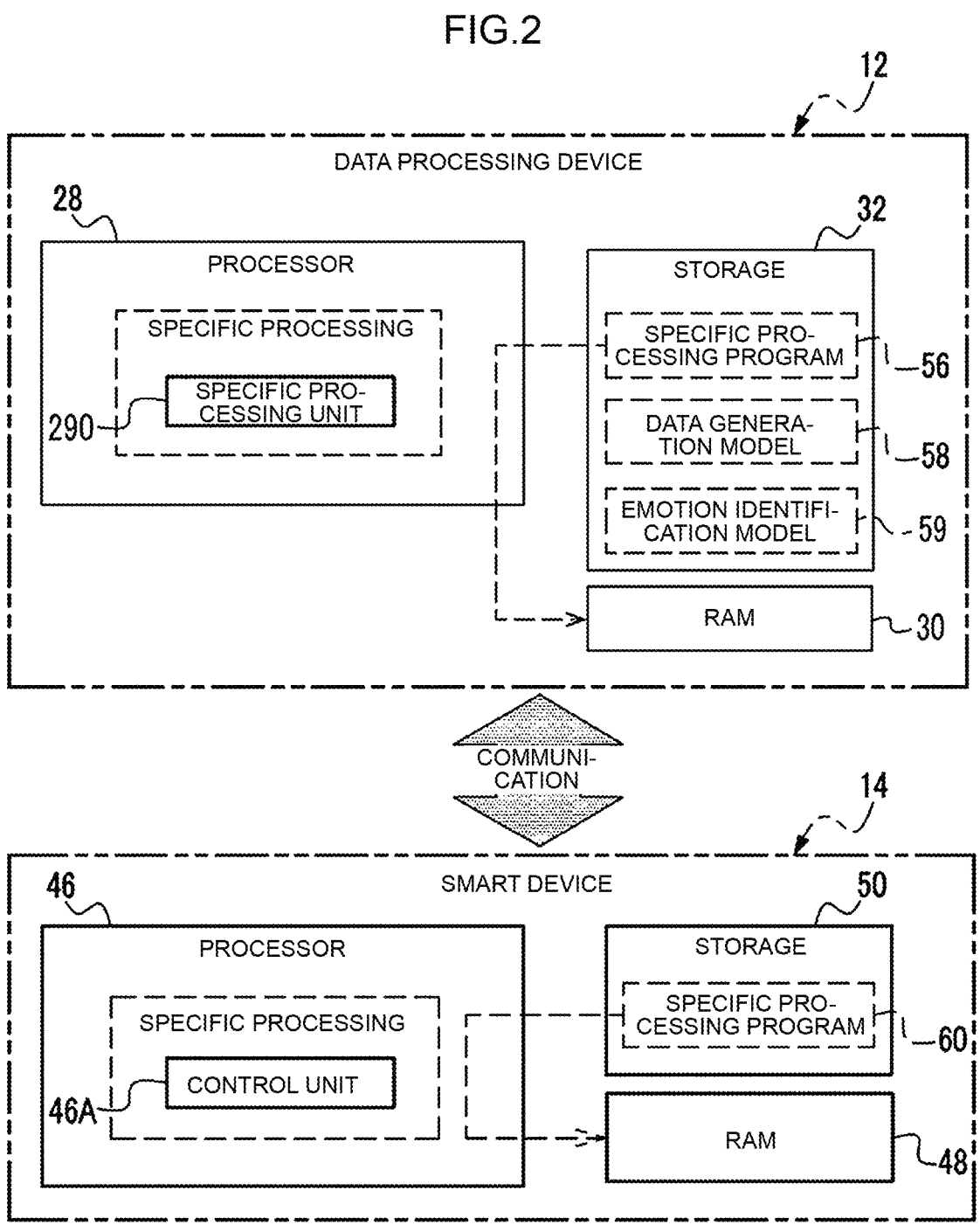
FIG. 2 is a conceptual diagram showing an example of main functions of a data processing device and a smart device according to the first embodiment.

FIG. 2 shows an example of the main functions of the data processing device 12 and the smart device 14.

As shown in FIG. 2, specific processing is performed in the data processing device 12 by the processor 28. The storage 32 stores a specific processing program 56. The specific processing program 56 is an example of a "program" related to the technology disclosed herein. The processor 28 reads the specific processing program 56 from the storage 32 and executes it on the RAM 30. The specific processing is realized by the processor 28 operating as a specific processing unit 290 according to the specific processing program 56 executed on the RAM 30.

The storage 32 stores a data generation model 58 and an emotion identification model 59. The data generation model 58 and emotion identification model 59 are used by the specific processing unit 290. The specific processing unit 290 can estimate the user's emotions using the emotion identification model 59 and perform specific processing using the user's emotions. The emotion estimation function (emotion identification function) using the emotion identification model 59 includes estimating and predicting the user's emotions, but is not limited to such examples. Furthermore, emotion estimation and prediction may include, for example, emotion analysis.

In the smart device 14, specific processing is performed by the processor 46. The storage 50 stores a specific processing program 60. The specific processing program 60 is used in conjunction with the specific processing program 56 by the data processing system 10. The processor 46 reads the specific processing program 60 from the storage 50 and executes it on the RAM 48. The specific processing is realized by the processor 46 operating as a control unit 46A according to the specific processing program 60 executed on the RAM 48. The smart device 14 may also have similar data generation models and emotion identification models as the data generation model 58 and emotion identification model 59, and perform the same processing as the specific processing unit 290 using these models.

Other devices besides the data processing device 12 may have the data generation model 58. For example, a server device (e.g., a generation server) may have the data generation model 58. In this case, the data processing device 12 communicates with the server device having the data generation model 58 to obtain processing results (e.g., prediction results) using the data generation model 58. The data processing device 12 may be a server device or a terminal device owned by the user (e.g., a mobile phone, robot, home appliance, etc.). Next, an example of processing by the data processing system 10 according to the first embodiment will be described.

Example 1 of the Embodiment

The agricultural support system according to the embodiment of the present invention is a system that monitors the condition of a farm in real time through IoT devices and centrally manages the data. In this system, IoT devices installed on the farm collect environmental data such as soil moisture, temperature, amount of sunlight, soil pH value, and wind speed. The collected data is transmitted to a cloud database and centrally managed. This data is analyzed using generative AI, which performs crop growth prediction and disease warning. For example, the generative AI compares past data with current data to predict crop growth patterns. In addition, when abnormal data is detected, a disease warning is issued. Furthermore, the generative AI provides optimal crop management advice, greatly improving agricultural efficiency. This integrated approach minimizes the impact of climate change and enables sustainable agriculture. For example, the types of data collected by IoT devices can be increased, and the analysis methods and algorithms of generative AI can be described in detail. In addition, security measures and backup methods for centralized data management, specific examples of advice provided by generative AI, and criteria and countermeasures for abnormality detection are also described in detail. As a result, the agricultural support system can monitor the condition of the farm in real time, centrally manage data, and provide optimal crop management advice based on analysis results.

The agricultural support system according to the embodiment comprises a collection unit, a management unit, an analysis unit, and a provision unit. The collection unit collects environmental data such as soil moisture, temperature, amount of sunlight, soil pH value, and wind speed using IoT devices installed on the farm. For example, the collection unit measures soil moisture using a soil moisture sensor. The collection unit can also measure the temperature of the farm using a temperature sensor. Furthermore, the collection unit can measure the amount of sunlight on the farm using a sunlight sensor. For example, the collection unit can measure the acidity of the soil using a soil pH sensor. The wind speed on the farm can also be measured using a wind speed sensor. The management unit transmits the data collected by the collection unit to a cloud database and centrally manages it. For example, the management unit transmits the collected data to the cloud database in real time. The management unit also includes security measures and backup methods for the data. For example, the management unit encrypts the data and implements access control. Furthermore, the management unit regularly backs up the data and establishes data recovery procedures. The analysis unit analyzes the data managed by the management unit using generative AI. For example, the analysis unit compares past data with current data to predict crop growth patterns. In addition, when abnormal data is detected, the analysis unit issues a disease warning. For example, the analysis unit uses generative AI to detect abnormal data and issue disease warnings. The provision unit provides optimal crop management advice based on the analysis results obtained by the analysis unit. For example, the provision unit uses generative AI to advise on the optimal timing of fertilization and the amount of watering for crop growth. The provision unit also uses generative AI to advise on measures for disease prevention in crops. As a result, the agricultural support system according to the embodiment can monitor the condition of the farm in real time, centrally manage data, and provide optimal crop management advice based on analysis results.

The collection unit can collect environmental data including soil moisture, temperature, amount of sunlight, soil pH value, and wind speed. For example, the collection unit measures soil moisture using a soil moisture sensor. For example, the collection unit installs soil moisture sensors at various locations on the farm and can measure soil moisture in real time. The collection unit can also measure the temperature of the farm using a temperature sensor. For example, the collection unit installs temperature sensors at various locations on the farm and can measure temperature in real time. Furthermore, the collection unit can measure the amount of sunlight on the farm using a sunlight sensor. For example, the collection unit installs sunlight sensors at various locations on the farm and can measure the amount of sunlight in real time. The collection unit can also measure the acidity of the soil using a soil pH sensor. For example, the collection unit installs soil pH sensors at various locations on the farm and can measure soil acidity in real time. The collection unit can also measure the wind speed on the farm using a wind speed sensor. For example, the collection unit installs wind speed sensors at various locations on the farm and can measure wind speed in real time. By collecting detailed environmental data in this way, the condition of the farm can be accurately grasped. Some or all of the above-described processing in the collection unit may be performed using AI, or may be performed without using AI. For example, the collection unit can input data obtained from sensors into generative AI and have the generative AI perform data analysis.

The management unit can transmit the collected data to a cloud database and centrally manage it. For example, the management unit transmits the collected data to the cloud database in real time. For example, the management unit transmits the collected data to the cloud database and performs centralized data management. The management unit also includes security measures and backup methods for the data. For example, the management unit encrypts the data and implements access control. For example, the management unit encrypts the data and ensures security during data transmission. The management unit also implements access control and manages access rights to the data. Furthermore, the management unit regularly backs up the data and establishes data recovery procedures. For example, the management unit regularly backs up the data and establishes data recovery procedures. By centrally managing data in the cloud in this way, data access and management become easier. Some or all of the above-described processing in the management unit may be performed using AI, or may be performed without using AI. For example, the management unit can input data transmitted to the cloud database into generative AI and have the generative AI perform data management.

The management unit can include security measures and backup methods for the data. For example, the management unit encrypts the data and implements access control. For example, the management unit encrypts the data and ensures security during data transmission. The management unit also implements access control and manages access rights to the data. For example, the management unit implements access control and manages access rights to the data. Furthermore, the management unit regularly backs up the data and establishes data recovery procedures. For example, the management unit regularly backs up the data and establishes data recovery procedures. In this way, data security and backup are ensured. Some or all of the above-described processing in the management unit may be performed using AI, or may be performed without using AI. For example, the management unit can have generative AI perform data encryption and access control settings.

The analysis unit can compare past data with current data and predict crop growth patterns. For example, the analysis unit compares past data with current data and predicts crop growth patterns. For example, the analysis unit compares past data with current data and predicts crop growth patterns. For example, the analysis unit compares past data with current data and predicts crop growth patterns. For example, the analysis unit compares past data with current data and predicts crop growth patterns. By predicting crop growth patterns in this way, appropriate crop management becomes possible. Some or all of the above-described processing in the analysis unit may be performed using generative AI, or may be performed without using generative AI. For example, the analysis unit can input past and current data into generative AI and have the generative AI predict crop growth patterns.

The analysis unit can issue a disease warning when abnormal data is detected. For example, the analysis unit issues a disease warning when abnormal data is detected. For example, the analysis unit issues a disease warning when abnormal data is detected. For example, the analysis unit issues a disease warning when abnormal data is detected. For example, the analysis unit issues a disease warning when abnormal data is detected. In this way, early disease warnings can be issued by detecting abnormal data. Some or all of the above-described processing in the analysis unit may be performed using generative AI, or may be performed without using generative AI. For example, the analysis unit can input abnormal data into generative AI and have the generative AI issue disease warnings.

The provision unit can provide crop management advice. For example, the provision unit uses generative AI to advise on the optimal timing of fertilization and the amount of watering for crop growth. For example, the provision unit uses generative AI to advise on the optimal timing of fertilization and the amount of watering for crop growth. For example, the provision unit uses generative AI to advise on the optimal timing of fertilization and the amount of watering for crop growth. For example, the provision unit uses generative AI to advise on the optimal timing of fertilization and the amount of watering for crop growth. By providing optimal crop management advice in this way, agricultural efficiency is improved. Some or all of the above-described processing in the provision unit may be performed using generative AI, or may be performed without using generative AI. For example, the provision unit can input crop growth data into generative AI and have the generative AI provide optimal management advice.

The collection unit can analyze past collection data and select the optimal data collection method. For example, the collection unit identifies the most effective collection timing based on past data collection history. For example, the collection unit identifies the most effective collection timing based on past data collection history. For example, the collection unit analyzes past data collection methods and determines the most efficient sensor placement. For example, the collection unit analyzes past data collection methods and determines the most efficient sensor placement. For example, the collection unit evaluates past data collection results and identifies improvements in collection methods. For example, the collection unit evaluates past data collection results and identifies improvements in collection methods. By analyzing past data in this way, the optimal data collection method can be selected. Some or all of the above-described processing in the collection unit may be performed using generative AI, or may be performed without using generative AI. For example, the collection unit can input past collection data into generative AI and have the generative AI select the optimal data collection method.

The collection unit can focus on specific areas of the farm during data collection and collect detailed data. For example, when an abnormality is detected in a specific area of the farm, the collection unit collects detailed data for that area. For example, when an abnormality is detected in a specific area of the farm, the collection unit collects detailed data for that area. For example, when crop growth is delayed in a specific area of the farm, the collection unit collects detailed environmental data for that area. For example, when crop growth is delayed in a specific area of the farm, the collection unit collects detailed environmental data for that area. For example, when a disease occurs in a specific area of the farm, the collection unit intensively collects data for that area. For example, when a disease occurs in a specific area of the farm, the collection unit intensively collects data for that area. By focusing on specific areas in this way, detailed data can be collected. Some or all of the above-described processing in the collection unit may be performed using generative AI, or may be performed without using generative AI. For example, the collection unit can input data from specific areas into generative AI and have the generative AI perform detailed data collection.

The collection unit can prioritize the collection of highly relevant data based on the geographical location information of the farm during data collection. For example, the collection unit prioritizes the collection of data from areas with different climate conditions based on the geographical location information of the farm. For example, the collection unit prioritizes the collection of data from areas with different climate conditions based on the geographical location information of the farm. For example, the collection unit prioritizes the collection of data from areas with different soil characteristics based on the geographical location information of the farm. For example, the collection unit prioritizes the collection of data from areas with different soil characteristics based on the geographical location information of the farm. For example, the collection unit prioritizes the collection of data from areas with different crop types based on the geographical location information of the farm. For example, the collection unit prioritizes the collection of data from areas with different crop types based on the geographical location information of the farm. By considering geographical location information in this way, highly relevant data can be prioritized for collection. Some or all of the above-described processing in the collection unit may be performed using generative AI, or may be performed without using generative AI. For example, the collection unit can input geographical location information into generative AI and have the generative AI perform the collection of highly relevant data.

The collection unit can refer to the historical data of the farm during data collection to improve the accuracy of collection. For example, the collection unit identifies past abnormal patterns based on the historical data of the farm and improves the accuracy of collection. For example, the collection unit identifies past abnormal patterns based on the historical data of the farm and improves the accuracy of collection. For example, the collection unit optimizes data collection methods for each season based on the historical data of the farm. For example, the collection unit optimizes data collection methods for each season based on the historical data of the farm. For example, the collection unit predicts the growth patterns of specific crops based on the historical data of the farm and improves the accuracy of collection. For example, the collection unit predicts the growth patterns of specific crops based on the historical data of the farm and improves the accuracy of collection. By referring to historical data in this way, the accuracy of collection can be improved. Some or all of the above-described processing in the collection unit may be performed using generative AI, or may be performed without using generative AI. For example, the collection unit can input historical data into generative AI and have the generative AI improve collection accuracy.

The management unit can refer to past management data during data management to select the optimal management method. For example, the management unit identifies the most effective management method based on past data management history. For example, the management unit identifies the most effective management method based on past data management history. For example, the management unit analyzes past data management methods and determines the most efficient management technique. For example, the management unit analyzes past data management methods and determines the most efficient management technique. For example, the management unit evaluates past data management results and identifies improvements in management methods. For example, the management unit evaluates past data management results and identifies improvements in management methods. By referring to past data in this way, the optimal management method can be selected. Some or all of the above-described processing in the management unit may be performed using generative AI, or may be performed without using generative AI. For example, the management unit can input past management data into generative AI and have the generative AI select the optimal management method.

The management unit can adjust the level of detail in management according to the importance of the data during data management. For example, important data is managed in detail and backed up frequently. For example, important data is managed in detail and backed up frequently. For example, less important data is managed in a simplified manner and the backup frequency is reduced. For example, less important data is managed in a simplified manner and the backup frequency is reduced. For example, the management unit adjusts access rights according to the importance of the data. For example, the management unit adjusts access rights according to the importance of the data. By adjusting the level of detail in management according to the importance of the data in this way, efficient data management becomes possible. Some or all of the above-described processing in the management unit may be performed using generative AI, or may be performed without using generative AI. For example, the management unit can input the importance of the data into generative AI and have the generative AI adjust the level of detail in management.

The management unit can determine the priority of management according to the submission timing of the data during data management. For example, data with a near deadline is managed with priority. For example, data with a near deadline is managed with priority. For example, data with a distant deadline is postponed. For example, data with a distant deadline is postponed. For example, the management unit adjusts the backup frequency of data based on the submission timing. For example, the management unit adjusts the backup frequency of data based on the submission timing. By determining the priority of management based on the submission timing in this way, efficient data management becomes possible. Some or all of the above-described processing in the management unit may be performed using generative AI, or may be performed without using generative AI. For example, the management unit can input data with submission timing into generative AI and have the generative AI determine the priority of management.

The management unit can adjust the order of management based on the relevance of the data during data management. For example, highly relevant data is managed with priority. For example, highly relevant data is managed with priority. For example, less relevant data is postponed. For example, less relevant data is postponed. For example, the management unit adjusts the level of detail in management based on the relevance of the data. For example, the management unit adjusts the level of detail in management based on the relevance of the data. By adjusting the order of management based on the relevance of the data in this way, efficient data management becomes possible. Some or all of the above-described processing in the management unit may be performed using generative AI, or may be performed without using generative AI. For example, the management unit can input the relevance of the data into generative AI and have the generative AI adjust the order of management.

The analysis unit can refer to past analysis data during analysis to select the optimal analysis method. For example, the analysis unit identifies the most effective analysis method based on past analysis data. For example, the analysis unit identifies the most effective analysis method based on past analysis data. For example, the analysis unit analyzes past analysis methods and determines the most efficient analysis technique. For example, the analysis unit analyzes past analysis methods and determines the most efficient analysis technique. For example, the analysis unit evaluates past analysis results and identifies improvements in analysis methods. For example, the analysis unit evaluates past analysis results and identifies improvements in analysis methods. By referring to past data in this way, the optimal analysis method can be selected. Some or all of the above-described processing in the analysis unit may be performed using generative AI, or may be performed without using generative AI. For example, the analysis unit can input past analysis data into generative AI and have the generative AI select the optimal analysis method.

The analysis unit can apply different analysis algorithms according to the type of data during analysis. For example, the analysis unit applies specific algorithms to environmental data and performs detailed analysis. For example, the analysis unit applies specific algorithms to environmental data and performs detailed analysis. For example, the analysis unit applies different algorithms to crop data and predicts growth patterns. For example, the analysis unit applies different algorithms to crop data and predicts growth patterns. For example, the analysis unit applies specific algorithms to abnormal data and quickly detects abnormalities. For example, the analysis unit applies specific algorithms to abnormal data and quickly detects abnormalities. By applying optimal analysis algorithms according to the data category in this way, appropriate analysis can be performed. Some or all of the above-described processing in the analysis unit may be performed using generative AI, or may be performed without using generative AI. For example, the analysis unit can input the type of data into generative AI and have the generative AI apply different analysis algorithms.

The analysis unit can determine the priority of analysis according to the submission timing of the data during analysis. For example, data with a near deadline is analyzed with priority. For example, data with a near deadline is analyzed with priority. For example, data with a distant deadline is postponed. For example, data with a distant deadline is postponed. For example, the analysis unit adjusts the level of detail in analysis based on the submission timing. For example, the analysis unit adjusts the level of detail in analysis based on the submission timing. By determining the priority of analysis based on the submission timing in this way, efficient data analysis becomes possible. Some or all of the above-described processing in the analysis unit may be performed using generative AI, or may be performed without using generative AI. For example, the analysis unit can input data with submission timing into generative AI and have the generative AI determine the priority of analysis.

The analysis unit can adjust the order of analysis based on the relevance of the data during analysis. For example, highly relevant data is analyzed with priority. For example, highly relevant data is analyzed with priority. For example, less relevant data is postponed. For example, less relevant data is postponed. For example, the analysis unit adjusts the level of detail in analysis based on the relevance of the data. For example, the analysis unit adjusts the level of detail in analysis based on the relevance of the data. By adjusting the order of analysis based on the relevance of the data in this way, efficient data analysis becomes possible. Some or all of the above-described processing in the analysis unit may be performed using generative AI, or may be performed without using generative AI. For example, the analysis unit can input the relevance of the data into generative AI and have the generative AI adjust the order of analysis.

The provision unit can refer to past advice data during advice provision to select the optimal advice method. For example, the provision unit identifies the most effective advice method based on past advice data. For example, the provision unit identifies the most effective advice method based on past advice data. For example, the provision unit analyzes past advice methods and determines the most efficient advice technique. For example, the provision unit analyzes past advice methods and determines the most efficient advice technique. For example, the provision unit evaluates past advice results and identifies improvements in advice methods. For example, the provision unit evaluates past advice results and identifies improvements in advice methods. By referring to past data in this way, the optimal advice method can be selected. Some or all of the above-described processing in the provision unit may be performed using generative AI, or may be performed without using generative AI. For example, the provision unit can input past advice data into generative AI and have the generative AI select the optimal advice method.

The provision unit can adjust the level of detail according to the importance of the advice during advice provision. For example, important advice is provided in detail and specific procedures are shown. For example, important advice is provided in detail and specific procedures are shown. For example, less important advice is provided in a simplified manner. For example, less important advice is provided in a simplified manner. For example, the provision unit adjusts the amount of information provided according to the importance of the advice. For example, the provision unit adjusts the amount of information provided according to the importance of the advice. By adjusting the level of detail according to the importance of the advice in this way, efficient advice provision becomes possible. Some or all of the above-described processing in the provision unit may be performed using generative AI, or may be performed without using generative AI. For example, the provision unit can input the importance of the advice into generative AI and have the generative AI adjust the level of detail.

The provision unit can determine the priority according to the submission timing of the advice during advice provision. For example, advice with a near deadline is provided with priority. For example, advice with a near deadline is provided with priority. For example, advice with a distant deadline is postponed. For example, advice with a distant deadline is postponed. For example, the provision unit adjusts the level of detail in advice based on the submission timing. For example, the provision unit adjusts the level of detail in advice based on the submission timing. By determining the priority of advice based on the submission timing in this way, efficient advice provision becomes possible. Some or all of the above-described processing in the provision unit may be performed using generative AI, or may be performed without using generative AI. For example, the provision unit can input data with submission timing into generative AI and have the generative AI determine the priority of advice.

The provision unit can adjust the order based on the relevance of the advice during advice provision. For example, highly relevant advice is provided with priority. For example, highly relevant advice is provided with priority. For example, less relevant advice is postponed. For example, less relevant advice is postponed. For example, the provision unit adjusts the amount of information provided based on the relevance of the advice. For example, the provision unit adjusts the amount of information provided based on the relevance of the advice. By adjusting the order based on the relevance of the advice in this way, efficient advice provision becomes possible. Some or all of the above-described processing in the provision unit may be performed using generative AI, or may be performed without using generative AI. For example, the provision unit can input the relevance of the advice into generative AI and have the generative AI adjust the order.

The system according to the embodiment is not limited to the above examples, and various modifications are possible, for example, as described below.

The agricultural support system may further include a weather prediction unit. The weather prediction unit predicts future weather conditions based on environmental data obtained from the collection unit. For example, the weather prediction unit can compare past weather data with current environmental data to predict rainfall and temperature fluctuations for the next few days. The weather prediction unit can also predict changes in wind speed and direction and propose crop protection measures. Furthermore, the weather prediction unit can provide early warnings of abnormal weather and provide information for adjusting agricultural activity plans. As a result, the agricultural support system enables rapid response to changes in weather conditions and can optimize crop protection and harvest.

The agricultural support system may further include an automatic irrigation unit. The automatic irrigation unit automatically adjusts the optimal irrigation timing and water amount based on soil moisture data obtained from the collection unit. For example, when soil moisture decreases, the automatic irrigation unit can automatically start irrigation and supply the appropriate amount of water. The automatic irrigation unit can also refrain from irrigation when rainfall is predicted based on information from the weather prediction unit. Furthermore, the automatic irrigation unit can adjust the frequency and amount of irrigation according to the crop growth stage to provide the optimal growth environment. As a result, the agricultural support system can achieve efficient use of water resources and healthy crop growth.

The agricultural support system may further include a pest detection unit. The pest detection unit detects the presence of pests on crops based on environmental data and image data obtained from the collection unit. For example, the pest detection unit can identify pests attached to leaves and stems using image analysis technology. The pest detection unit can also predict the risk of pest outbreaks based on environmental data and provide information for early countermeasures. Furthermore, the pest detection unit can propose optimal extermination methods according to the type of detected pest. As a result, the agricultural support system can minimize damage caused by pests and improve crop quality and yield.

The agricultural support system may further include a harvest prediction unit. The harvest prediction unit predicts the optimal harvest time based on environmental data and crop growth data obtained from the collection unit. For example, the harvest prediction unit analyzes crop growth patterns and weather conditions and can notify the optimal timing for harvest. The harvest prediction unit can also propose work plans according to the harvest time and support efficient harvesting operations. Furthermore, the harvest prediction unit can predict harvest yields and provide information for planning shipments and market supply. As a result, the agricultural support system can achieve efficient harvesting operations and maximize profits.

The following is a brief explanation of the process flow of Example 1 of the Embodiment.

Step 1: The collection unit collects environmental data such as soil moisture, temperature, amount of sunlight, soil pH value, and wind speed using IoT devices installed on the farm. For example, the collection unit measures soil moisture using a soil moisture sensor, measures the temperature of the farm using a temperature sensor, measures the amount of sunlight on the farm using a sunlight sensor, measures the acidity of the soil using a soil pH sensor, and measures the wind speed on the farm using a wind speed sensor.

Step 2: The management unit transmits the data collected by the collection unit to a cloud database and centrally manages it. For example, the management unit transmits the collected data to the cloud database in real time and includes security measures and backup methods for the data. The management unit encrypts the data, implements access control, regularly backs up the data, and establishes data recovery procedures.

Step 3: The analysis unit analyzes the data managed by the management unit using generative AI. For example, the analysis unit compares past data with current data to predict crop growth patterns and issues disease warnings when abnormal data is detected.

Step 4: The provision unit provides optimal crop management advice based on the analysis results obtained by the analysis unit. For example, the provision unit uses generative AI to advise on the optimal timing of fertilization and the amount of watering for crop growth, and advises on measures for disease prevention in crops.

Example 2 of the Embodiment

The agricultural support system according to the embodiment of the present invention is a system that monitors the condition of a farm in real time through IoT devices and centrally manages the data. In this system, IoT devices installed on the farm collect environmental data such as soil moisture, temperature, amount of sunlight, soil pH value, and wind speed. The collected data is transmitted to a cloud database and centrally managed. This data is analyzed using generative AI, which performs crop growth prediction and disease warning. For example, the generative AI compares past data with current data to predict crop growth patterns. In addition, when abnormal data is detected, a disease warning is issued. Furthermore, the generative AI provides optimal crop management advice, greatly improving agricultural efficiency. This integrated approach minimizes the impact of climate change and enables sustainable agriculture. For example, the types of data collected by IoT devices can be increased, and the analysis methods and algorithms of generative AI can be described in detail. In addition, security measures and backup methods for centralized data management, specific examples of advice provided by generative AI, and criteria and countermeasures for abnormality detection are also described in detail. As a result, the agricultural support system can monitor the condition of the farm in real time, centrally manage data, and provide optimal crop management advice based on analysis results.

The agricultural support system according to the embodiment comprises a collection unit, a management unit, an analysis unit, and a provision unit. The collection unit collects environmental data such as soil moisture, temperature, amount of sunlight, soil pH value, and wind speed using IoT devices installed on the farm. For example, the collection unit measures soil moisture using a soil moisture sensor. The collection unit can also measure the temperature of the farm using a temperature sensor. Furthermore, the collection unit can measure the amount of sunlight on the farm using a sunlight sensor. For example, the collection unit can measure the acidity of the soil using a soil pH sensor. The wind speed on the farm can also be measured using a wind speed sensor. The management unit transmits the data collected by the collection unit to a cloud database and centrally manages it. For example, the management unit transmits the collected data to the cloud database in real time. The management unit also includes security measures and backup methods for the data. For example, the management unit encrypts the data and implements access control. Furthermore, the management unit regularly backs up the data and establishes data recovery procedures. The analysis unit analyzes the data managed by the management unit using generative AI. For example, the analysis unit compares past data with current data to predict crop growth patterns. In addition, when abnormal data is detected, the analysis unit issues a disease warning. For example, the analysis unit uses generative AI to detect abnormal data and issue disease warnings. The provision unit provides optimal crop management advice based on the analysis results obtained by the analysis unit. For example, the provision unit uses generative AI to advise on the optimal timing of fertilization and the amount of watering for crop growth. The provision unit also uses generative AI to advise on measures for disease prevention in crops. As a result, the agricultural support system according to the embodiment can monitor the condition of the farm in real time, centrally manage data, and provide optimal crop management advice based on analysis results.

The collection unit can collect environmental data including soil moisture, temperature, amount of sunlight, soil pH value, and wind speed. For example, the collection unit measures soil moisture using a soil moisture sensor. For example, the collection unit installs soil moisture sensors at various locations on the farm and can measure soil moisture in real time. The collection unit can also measure the temperature of the farm using a temperature sensor. For example, the collection unit installs temperature sensors at various locations on the farm and can measure temperature in real time. Furthermore, the collection unit can measure the amount of sunlight on the farm using a sunlight sensor. For example, the collection unit installs sunlight sensors at various locations on the farm and can measure the amount of sunlight in real time. The collection unit can also measure the acidity of the soil using a soil pH sensor. For example, the collection unit installs soil pH sensors at various locations on the farm and can measure soil acidity in real time. The collection unit can also measure the wind speed on the farm using a wind speed sensor. For example, the collection unit installs wind speed sensors at various locations on the farm and can measure wind speed in real time. By collecting detailed environmental data in this way, the condition of the farm can be accurately grasped. Some or all of the above-described processing in the collection unit may be performed using AI, or may be performed without using AI. For example, the collection unit can input data obtained from sensors into generative AI and have the generative AI perform data analysis.

The management unit can transmit the collected data to a cloud database and centrally manage it. For example, the management unit transmits the collected data to the cloud database in real time. For example, the management unit transmits the collected data to the cloud database and performs centralized data management. The management unit also includes security measures and backup methods for the data. For example, the management unit encrypts the data and implements access control. For example, the management unit encrypts the data and ensures security during data transmission. The management unit also implements access control and manages access rights to the data. Furthermore, the management unit regularly backs up the data and establishes data recovery procedures. For example, the management unit regularly backs up the data and establishes data recovery procedures. By centrally managing data in the cloud in this way, data access and management become easier. Some or all of the above-described processing in the management unit may be performed using AI, or may be performed without using AI. For example, the management unit can input data transmitted to the cloud database into generative AI and have the generative AI perform data management.

The management unit can include security measures and backup methods for the data. For example, the management unit encrypts the data and implements access control. For example, the management unit encrypts the data and ensures security during data transmission. The management unit also implements access control and manages access rights to the data. For example, the management unit implements access control and manages access rights to the data. Furthermore, the management unit regularly backs up the data and establishes data recovery procedures. For example, the management unit regularly backs up the data and establishes data recovery procedures. In this way, data security and backup are ensured. Some or all of the above-described processing in the management unit may be performed using AI, or may be performed without using AI. For example, the management unit can have generative AI perform data encryption and access control settings.

The analysis unit can compare past data with current data and predict crop growth patterns. For example, the analysis unit compares past data with current data and predicts crop growth patterns. For example, the analysis unit compares past data with current data and predicts crop growth patterns. For example, the analysis unit compares past data with current data and predicts crop growth patterns. For example, the analysis unit compares past data with current data and predicts crop growth patterns. By predicting crop growth patterns in this way, appropriate crop management becomes possible. Some or all of the above-described processing in the analysis unit may be performed using generative AI, or may be performed without using generative AI. For example, the analysis unit can input past and current data into generative AI and have the generative AI predict crop growth patterns.

The analysis unit can issue a disease warning when abnormal data is detected. For example, the analysis unit issues a disease warning when abnormal data is detected. For example, the analysis unit issues a disease warning when abnormal data is detected. For example, the analysis unit issues a disease warning when abnormal data is detected. For example, the analysis unit issues a disease warning when abnormal data is detected. In this way, early disease warnings can be issued by detecting abnormal data. Some or all of the above-described processing in the analysis unit may be performed using generative AI, or may be performed without using generative AI. For example, the analysis unit can input abnormal data into generative AI and have the generative AI issue disease warnings.

The provision unit can provide crop management advice. For example, the provision unit uses generative AI to advise on the optimal timing of fertilization and the amount of watering for crop growth. For example, the provision unit uses generative AI to advise on the optimal timing of fertilization and the amount of watering for crop growth. For example, the provision unit uses generative AI to advise on the optimal timing of fertilization and the amount of watering for crop growth. For example, the provision unit uses generative AI to advise on the optimal timing of fertilization and the amount of watering for crop growth. By providing optimal crop management advice in this way, agricultural efficiency is improved. Some or all of the above-described processing in the provision unit may be performed using generative AI, or may be performed without using generative AI. For example, the provision unit can input crop growth data into generative AI and have the generative AI provide optimal management advice.

The collection unit can estimate the user's emotions and adjust the timing of data collection based on the estimated emotions. For example, if the user is feeling stressed, the collection unit reduces the frequency of data collection and sends fewer notifications. For example, if the user is feeling stressed, the collection unit reduces the frequency of data collection and sends fewer notifications. For example, if the user is relaxed, the collection unit increases the frequency of data collection and provides detailed information. For example, if the user is in a hurry, the collection unit prioritizes the collection of only important data and sends notifications quickly. By adjusting the timing of data collection according to the user's emotions in this way, the user's burden can be reduced. Some or all of the above-described processing in the collection unit may be performed using generative AI, or may be performed without using generative AI. For example, the collection unit can input user emotion data into generative AI and have the generative AI adjust the timing of data collection.

The collection unit can analyze past collection data and select the optimal data collection method. For example, the collection unit identifies the most effective collection timing based on past data collection history. For example, the collection unit identifies the most effective collection timing based on past data collection history. For example, the collection unit analyzes past data collection methods and determines the most efficient sensor placement. For example, the collection unit analyzes past data collection methods and determines the most efficient sensor placement. For example, the collection unit evaluates past data collection results and identifies improvements in collection methods. For example, the collection unit evaluates past data collection results and identifies improvements in collection methods. By analyzing past data in this way, the optimal data collection method can be selected. Some or all of the above-described processing in the collection unit may be performed using generative AI, or may be performed without using generative AI. For example, the collection unit can input past collection data into generative AI and have the generative AI select the optimal data collection method.

The collection unit can focus on specific areas of the farm during data collection and collect detailed data. For example, when an abnormality is detected in a specific area of the farm, the collection unit collects detailed data for that area. For example, when an abnormality is detected in a specific area of the farm, the collection unit collects detailed data for that area. For example, when crop growth is delayed in a specific area of the farm, the collection unit collects detailed environmental data for that area. For example, when crop growth is delayed in a specific area of the farm, the collection unit collects detailed environmental data for that area. For example, when a disease occurs in a specific area of the farm, the collection unit intensively collects data for that area. For example, when a disease occurs in a specific area of the farm, the collection unit intensively collects data for that area. By focusing on specific areas in this way, detailed data can be collected. Some or all of the above-described processing in the collection unit may be performed using generative AI, or may be performed without using generative AI. For example, the collection unit can input data from specific areas into generative AI and have the generative AI perform detailed data collection.

The collection unit can estimate the user's emotions and determine the priority of data to be collected based on the estimated emotions. For example, if the user is feeling stressed, the collection unit prioritizes the collection of only important data. For example, if the user is feeling stressed, the collection unit prioritizes the collection of only important data. For example, if the user is relaxed, the collection unit prioritizes the collection of detailed data. For example, if the user is relaxed, the collection unit prioritizes the collection of detailed data. For example, if the user is in a hurry, the collection unit prioritizes the collection of data that can be collected quickly. For example, if the user is in a hurry, the collection unit prioritizes the collection of data that can be collected quickly. By determining the priority of data according to the user's emotions in this way, important data can be collected with priority. Some or all of the above-described processing in the collection unit may be performed using generative AI, or may be performed without using generative AI. For example, the collection unit can input user emotion data into generative AI and have the generative AI determine the priority of data.

The collection unit can prioritize the collection of highly relevant data based on the geographical location information of the farm during data collection. For example, the collection unit prioritizes the collection of data from areas with different climate conditions based on the geographical location information of the farm. For example, the collection unit prioritizes the collection of data from areas with different climate conditions based on the geographical location information of the farm. For example, the collection unit prioritizes the collection of data from areas with different soil characteristics based on the geographical location information of the farm. For example, the collection unit prioritizes the collection of data from areas with different soil characteristics based on the geographical location information of the farm. For example, the collection unit prioritizes the collection of data from areas with different crop types based on the geographical location information of the farm. For example, the collection unit prioritizes the collection of data from areas with different crop types based on the geographical location information of the farm. By considering geographical location information in this way, highly relevant data can be prioritized for collection. Some or all of the above-described processing in the collection unit may be performed using generative AI, or may be performed without using generative AI. For example, the collection unit can input geographical location information into generative AI and have the generative AI perform the collection of highly relevant data.

The collection unit can refer to the historical data of the farm during data collection to improve the accuracy of collection. For example, the collection unit identifies past abnormal patterns based on the historical data of the farm and improves the accuracy of collection. For example, the collection unit identifies past abnormal patterns based on the historical data of the farm and improves the accuracy of collection. For example, the collection unit optimizes data collection methods for each season based on the historical data of the farm. For example, the collection unit optimizes data collection methods for each season based on the historical data of the farm. For example, the collection unit predicts the growth patterns of specific crops based on the historical data of the farm and improves the accuracy of collection. For example, the collection unit predicts the growth patterns of specific crops based on the historical data of the farm and improves the accuracy of collection. By referring to historical data in this way, the accuracy of collection can be improved. Some or all of the above-described processing in the collection unit may be performed using generative AI, or may be performed without using generative AI. For example, the collection unit can input historical data into generative AI and have the generative AI improve collection accuracy.

The management unit can estimate the user's emotions and adjust the data management method based on the estimated emotions. For example, if the user is feeling stressed, the management unit provides a simple data management interface. For example, if the user is feeling stressed, the management unit provides a simple data management interface. For example, if the user is relaxed, the management unit provides detailed data management options. For example, if the user is relaxed, the management unit provides detailed data management options. For example, if the user is in a hurry, the management unit provides a data management method that allows quick access. For example, if the user is in a hurry, the management unit provides a data management method that allows quick access. By adjusting the data management method according to the user's emotions in this way, the user's burden can be reduced. Some or all of the above-described processing in the management unit may be performed using generative AI, or may be performed without using generative AI. For example, the management unit can input user emotion data into generative AI and have the generative AI adjust the data management method.

The management unit can refer to past management data during data management to select the optimal management method. For example, the management unit identifies the most effective management method based on past data management history. For example, the management unit identifies the most effective management method based on past data management history. For example, the management unit analyzes past data management methods and determines the most efficient management technique. For example, the management unit analyzes past data management methods and determines the most efficient management technique. For example, the management unit evaluates past data management results and identifies improvements in management methods. For example, the management unit evaluates past data management results and identifies improvements in management methods. By referring to past data in this way, the optimal management method can be selected. Some or all of the above-described processing in the management unit may be performed using generative AI, or may be performed without using generative AI. For example, the management unit can input past management data into generative AI and have the generative AI select the optimal management method.

The management unit can adjust the level of detail in management according to the importance of the data during data management. For example, important data is managed in detail and backed up frequently. For example, important data is managed in detail and backed up frequently. For example, less important data is managed in a simplified manner and the backup frequency is reduced. For example, less important data is managed in a simplified manner and the backup frequency is reduced. For example, the management unit adjusts access rights according to the importance of the data. For example, the management unit adjusts access rights according to the importance of the data. By adjusting the level of detail in management according to the importance of the data in this way, efficient data management becomes possible. Some or all of the above-described processing in the management unit may be performed using generative AI, or may be performed without using generative AI. For example, the management unit can input the importance of the data into generative AI and have the generative AI adjust the level of detail in management.

The management unit can estimate the user's emotions and determine the priority of data management based on the estimated emotions. For example, if the user is feeling stressed, the management unit prioritizes the management of only important data. For example, if the user is feeling stressed, the management unit prioritizes the management of only important data. For example, if the user is relaxed, the management unit prioritizes the management of detailed data. For example, if the user is relaxed, the management unit prioritizes the management of detailed data. For example, if the user is in a hurry, the management unit prioritizes the management of data that can be managed quickly. For example, if the user is in a hurry, the management unit prioritizes the management of data that can be managed quickly. By determining the priority of data management according to the user's emotions in this way, important data can be managed with priority. Some or all of the above-described processing in the management unit may be performed using generative AI, or may be performed without using generative AI. For example, the management unit can input user emotion data into generative AI and have the generative AI determine the priority of data management.

The management unit can determine the priority of management according to the submission timing of the data during data management. For example, data with a near deadline is managed with priority. For example, data with a near deadline is managed with priority. For example, data with a distant deadline is postponed. For example, data with a distant deadline is postponed. For example, the management unit adjusts the backup frequency of data based on the submission timing. For example, the management unit adjusts the backup frequency of data based on the submission timing. By determining the priority of management based on the submission timing in this way, efficient data management becomes possible. Some or all of the above-described processing in the management unit may be performed using generative AI, or may be performed without using generative AI. For example, the management unit can input data with submission timing into generative AI and have the generative AI determine the priority of management.

The management unit can adjust the order of management based on the relevance of the data during data management. For example, highly relevant data is managed with priority. For example, highly relevant data is managed with priority. For example, less relevant data is postponed. For example, less relevant data is postponed. For example, the management unit adjusts the level of detail in management based on the relevance of the data. For example, the management unit adjusts the level of detail in management based on the relevance of the data. By adjusting the order of management based on the relevance of the data in this way, efficient data management becomes possible. Some or all of the above-described processing in the management unit may be performed using generative AI, or may be performed without using generative AI. For example, the management unit can input the relevance of the data into generative AI and have the generative AI adjust the order of management.

The analysis unit can estimate the user's emotions and adjust the analysis method based on the estimated emotions. For example, if the user is relaxed, the analysis unit performs detailed analysis. For example, if the user is relaxed, the analysis unit performs detailed analysis. For example, if the user is in a hurry, the analysis unit performs rapid analysis. For example, if the user is in a hurry, the analysis unit performs rapid analysis. For example, if the user is feeling stressed, the analysis unit provides simple analysis results. For example, if the user is feeling stressed, the analysis unit provides simple analysis results. By adjusting the analysis method according to the user's emotions in this way, the user's burden can be reduced. Some or all of the above-described processing in the analysis unit may be performed using generative AI, or may be performed without using generative AI. For example, the analysis unit can input user emotion data into generative AI and have the generative AI adjust the analysis method.

The analysis unit can refer to past analysis data during analysis to select the optimal analysis method. For example, the analysis unit identifies the most effective analysis method based on past analysis data. For example, the analysis unit identifies the most effective analysis method based on past analysis data. For example, the analysis unit analyzes past analysis methods and determines the most efficient analysis technique. For example, the analysis unit analyzes past analysis methods and determines the most efficient analysis technique. For example, the analysis unit evaluates past analysis results and identifies improvements in analysis methods. For example, the analysis unit evaluates past analysis results and identifies improvements in analysis methods. By referring to past data in this way, the optimal analysis method can be selected. Some or all of the above-described processing in the analysis unit may be performed using generative AI, or may be performed without using generative AI. For example, the analysis unit can input past analysis data into generative AI and have the generative AI select the optimal analysis method.

The analysis unit can apply different analysis algorithms according to the type of data during analysis. For example, the analysis unit applies specific algorithms to environmental data and performs detailed analysis. For example, the analysis unit applies specific algorithms to environmental data and performs detailed analysis. For example, the analysis unit applies different algorithms to crop data and predicts growth patterns. For example, the analysis unit applies different algorithms to crop data and predicts growth patterns. For example, the analysis unit applies specific algorithms to abnormal data and quickly detects abnormalities. For example, the analysis unit applies specific algorithms to abnormal data and quickly detects abnormalities. By applying optimal analysis algorithms according to the data category in this way, appropriate analysis can be performed. Some or all of the above-described processing in the analysis unit may be performed using generative AI, or may be performed without using generative AI. For example, the analysis unit can input the type of data into generative AI and have the generative AI apply different analysis algorithms.

The analysis unit can estimate the user's emotions and determine the priority of analysis based on the estimated emotions. For example, if the user is feeling stressed, the analysis unit prioritizes the analysis of only important data. For example, if the user is feeling stressed, the analysis unit prioritizes the analysis of only important data. For example, if the user is relaxed, the analysis unit prioritizes the analysis of detailed data. For example, if the user is relaxed, the analysis unit prioritizes the analysis of detailed data. For example, if the user is in a hurry, the analysis unit prioritizes the analysis of data that can be analyzed quickly. For example, if the user is in a hurry, the analysis unit prioritizes the analysis of data that can be analyzed quickly. By determining the priority of analysis according to the user's emotions in this way, important data can be analyzed with priority. Some or all of the above-described processing in the analysis unit may be performed using generative AI, or may be performed without using generative AI. For example, the analysis unit can input user emotion data into generative AI and have the generative AI determine the priority of analysis.

The analysis unit can determine the priority of analysis according to the submission timing of the data during analysis. For example, data with a near deadline is analyzed with priority. For example, data with a near deadline is analyzed with priority. For example, data with a distant deadline is postponed. For example, data with a distant deadline is postponed. For example, the analysis unit adjusts the level of detail in analysis based on the submission timing. For example, the analysis unit adjusts the level of detail in analysis based on the submission timing. By determining the priority of analysis based on the submission timing in this way, efficient data analysis becomes possible. Some or all of the above-described processing in the analysis unit may be performed using generative AI, or may be performed without using generative AI. For example, the analysis unit can input data with submission timing into generative AI and have the generative AI determine the priority of analysis.

The analysis unit can adjust the order of analysis based on the relevance of the data during analysis. For example, highly relevant data is analyzed with priority. For example, highly relevant data is analyzed with priority. For example, less relevant data is postponed. For example, less relevant data is postponed. For example, the analysis unit adjusts the level of detail in analysis based on the relevance of the data. For example, the analysis unit adjusts the level of detail in analysis based on the relevance of the data. By adjusting the order of analysis based on the relevance of the data in this way, efficient data analysis becomes possible. Some or all of the above-described processing in the analysis unit may be performed using generative AI, or may be performed without using generative AI. For example, the analysis unit can input the relevance of the data into generative AI and have the generative AI adjust the order of analysis.

The provision unit can estimate the user's emotions and adjust the method of expressing advice based on the estimated emotions. For example, if the user is nervous, the provision unit provides advice in a calm manner. For example, if the user is nervous, the provision unit provides advice in a calm manner. For example, if the user is relaxed, the provision unit provides detailed advice. For example, if the user is relaxed, the provision unit provides detailed advice. For example, if the user is in a hurry, the provision unit provides concise and prompt advice. For example, if the user is in a hurry, the provision unit provides concise and prompt advice. By adjusting the method of expressing advice according to the user's emotions in this way, the provision unit can provide optimal advice for the user. Some or all of the above-described processing in the provision unit may be performed using generative AI, or may be performed without using generative AI. For example, the provision unit can input user emotion data into generative AI and have the generative AI adjust the method of expressing advice.

The provision unit can refer to past advice data during advice provision to select the optimal advice method. For example, the provision unit identifies the most effective advice method based on past advice data. For example, the provision unit identifies the most effective advice method based on past advice data. For example, the provision unit analyzes past advice methods and determines the most efficient advice technique. For example, the provision unit analyzes past advice methods and determines the most efficient advice technique. For example, the provision unit evaluates past advice results and identifies improvements in advice methods. For example, the provision unit evaluates past advice results and identifies improvements in advice methods. By referring to past data in this way, the optimal advice method can be selected.

Some or all of the above-described processing in the provision unit may be performed using generative AI, or may be performed without using generative AI. For example, the provision unit can input past advice data into generative AI and have the generative AI select the optimal advice method.

The provision unit can adjust the level of detail according to the importance of the advice during advice provision. For example, important advice is provided in detail and specific procedures are shown. For example, important advice is provided in detail and specific procedures are shown. For example, less important advice is provided in a simplified manner. For example, less important advice is provided in a simplified manner. For example, the provision unit adjusts the amount of information provided according to the importance of the advice. For example, the provision unit adjusts the amount of information provided according to the importance of the advice. By adjusting the level of detail according to the importance of the advice in this way, efficient advice provision becomes possible. Some or all of the above-described processing in the provision unit may be performed using generative AI, or may be performed without using generative AI. For example, the provision unit can input the importance of the advice into generative AI and have the generative AI adjust the level of detail.

The provision unit can estimate the user's emotions and determine the priority of advice based on the estimated emotions. For example, if the user is feeling stressed, the provision unit prioritizes the provision of only important advice. For example, if the user is feeling stressed, the provision unit prioritizes the provision of only important advice. For example, if the user is relaxed, the provision unit prioritizes the provision of detailed advice. For example, if the user is relaxed, the provision unit prioritizes the provision of detailed advice. For example, if the user is in a hurry, the provision unit prioritizes the provision of advice that can be provided quickly. For example, if the user is in a hurry, the provision unit prioritizes the provision of advice that can be provided quickly. By determining the priority of advice according to the user's emotions in this way, important advice can be provided with priority. Some or all of the above-described processing in the provision unit may be performed using generative AI, or may be performed without using generative AI. For example, the provision unit can input user emotion data into generative AI and have the generative AI determine the priority of advice.

The provision unit can determine the priority according to the submission timing of the advice during advice provision. For example, advice with a near deadline is provided with priority. For example, advice with a near deadline is provided with priority. For example, advice with a distant deadline is postponed. For example, advice with a distant deadline is postponed. For example, the provision unit adjusts the level of detail in advice based on the submission timing. For example, the provision unit adjusts the level of detail in advice based on the submission timing. By determining the priority of advice based on the submission timing in this way, efficient advice provision becomes possible. Some or all of the above-described processing in the provision unit may be performed using generative AI, or may be performed without using generative AI. For example, the provision unit can input data with submission timing into generative AI and have the generative AI determine the priority of advice.

The provision unit can adjust the order based on the relevance of the advice during advice provision. For example, highly relevant advice is provided with priority.

For example, highly relevant advice is provided with priority. For example, less relevant advice is postponed. For example, less relevant advice is postponed. For example, the provision unit adjusts the amount of information provided based on the relevance of the advice. For example, the provision unit adjusts the amount of information provided based on the relevance of the advice. By adjusting the order based on the relevance of the advice in this way, efficient advice provision becomes possible. Some or all of the above-described processing in the provision unit may be performed using generative AI, or may be performed without using generative AI. For example, the provision unit can input the relevance of the advice into generative AI and have the generative AI adjust the order.

The system according to the embodiment is not limited to the above examples, and various modifications are possible, for example, as described below.

The agricultural support system may further include a weather prediction unit. The weather prediction unit predicts future weather conditions based on environmental data obtained from the collection unit. For example, the weather prediction unit can compare past weather data with current environmental data to predict rainfall and temperature fluctuations for the next few days. The weather prediction unit can also predict changes in wind speed and direction and propose crop protection measures. Furthermore, the weather prediction unit can provide early warnings of abnormal weather and provide information for adjusting agricultural activity plans. As a result, the agricultural support system enables rapid response to changes in weather conditions and can optimize crop protection and harvest.

The agricultural support system may further include a health management unit that monitors the user's health status. The health management unit measures the user's heart rate and stress level and provides advice to reduce the burden of farm work. For example, if the user's heart rate is high, the health management unit can notify the user to take a break. In addition, if the user's stress level is high, the health management unit can propose methods for relaxation. Furthermore, the health management unit can collect the user's health data and provide information for establishing a long-term health management plan. As a result, the agricultural support system can maintain the user's health and improve the efficiency of farm work.

The agricultural support system may further include an automatic irrigation unit. The automatic irrigation unit automatically adjusts the optimal irrigation timing and water amount based on soil moisture data obtained from the collection unit. For example, when soil moisture decreases, the automatic irrigation unit can automatically start irrigation and supply the appropriate amount of water. The automatic irrigation unit can also refrain from irrigation when rainfall is predicted based on information from the weather prediction unit. Furthermore, the automatic irrigation unit can adjust the frequency and amount of irrigation according to the crop growth stage to provide the optimal growth environment. As a result, the agricultural support system can achieve efficient use of water resources and healthy crop growth.

The agricultural support system may further include a pest detection unit. The pest detection unit detects the presence of pests on crops based on environmental data and image data obtained from the collection unit. For example, the pest detection unit can identify pests attached to leaves and stems using image analysis technology. The pest detection unit can also predict the risk of pest outbreaks based on environmental data and provide information for early countermeasures.

Furthermore, the pest detection unit can propose optimal extermination methods according to the type of detected pest. As a result, the agricultural support system can minimize damage caused by pests and improve crop quality and yield.

The agricultural support system may further include a harvest prediction unit. The harvest prediction unit predicts the optimal harvest time based on environmental data and crop growth data obtained from the collection unit. For example, the harvest prediction unit analyzes crop growth patterns and weather conditions and can notify the optimal timing for harvest. The harvest prediction unit can also propose work plans according to the harvest time and support efficient harvesting operations. Furthermore, the harvest prediction unit can predict harvest yields and provide information for planning shipments and market supply. As a result, the agricultural support system can achieve efficient harvesting operations and maximize profits.

The agricultural support system may further estimate the user's emotions and adjust the farm work schedule based on the estimated emotions. For example, if the user feels fatigued, the schedule can be relaxed to reduce the workload. In addition, if the user is highly motivated, the schedule can be optimized to proceed with work efficiently. Furthermore, if the user is feeling stressed, the system can increase break times for relaxation. As a result, the agricultural support system can achieve flexible schedule management according to the user's emotions, improving work efficiency and user satisfaction.

The agricultural support system may further estimate the user's emotions and adjust the content and frequency of notifications based on the estimated emotions. For example, if the user is feeling stressed, only important notifications are sent and the frequency of notifications is reduced. In addition, if the user is relaxed, notifications containing detailed information can be sent to support farm work planning. Furthermore, if the user is in a hurry, concise and prompt notifications can be sent to quickly provide the necessary information. As a result, the agricultural support system can achieve appropriate notification management according to the user's emotions and reduce the user's burden.

The agricultural support system may further estimate the user's emotions and adjust the data display method based on the estimated emotions. For example, if the user is feeling stressed, a simple and easy-to-read data display can be provided. In addition, if the user is relaxed, detailed data and graphs can be displayed to support farm work planning. Furthermore, if the user is in a hurry, only important data can be highlighted and information can be provided quickly. As a result, the agricultural support system can achieve flexible data display according to the user's emotions and improve user convenience.

The agricultural support system may further estimate the user's emotions and adjust the content of advice based on the estimated emotions. For example, if the user is feeling stressed, concise and easy-to-implement advice can be provided. In addition, if the user is relaxed, advice including detailed explanations and background information can be provided. Furthermore, if the user is in a hurry, advice that can be implemented quickly can be provided to support efficient work. As a result, the agricultural support system can provide appropriate advice according to the user's emotions, improving the efficiency of farm work and user satisfaction.

The agricultural support system may further estimate the user's emotions and customize the system interface based on the estimated emotions. For example, if the user is feeling stressed, a simple and intuitive interface can be provided. In addition, if the user is relaxed, an interface with detailed setting options can be provided. Furthermore, if the user is in a hurry, shortcuts for quick operation can be provided to support efficient operation. As a result, the agricultural support system can achieve a flexible interface according to the user's emotions and improve user convenience and satisfaction.

The following is a brief explanation of the process flow of Example 2 of the Embodiment.

Step 1: The collection unit collects environmental data such as soil moisture, temperature, amount of sunlight, soil pH value, and wind speed using IoT devices installed on the farm. For example, the collection unit measures soil moisture using a soil moisture sensor, measures the temperature of the farm using a temperature sensor, measures the amount of sunlight on the farm using a sunlight sensor, measures the acidity of the soil using a soil pH sensor, and measures the wind speed on the farm using a wind speed sensor.

Step 2: The management unit transmits the data collected by the collection unit to a cloud database and centrally manages it. For example, the management unit transmits the collected data to the cloud database in real time and includes security measures and backup methods for the data. The management unit encrypts the data, implements access control, regularly backs up the data, and establishes data recovery procedures.

Step 3: The analysis unit analyzes the data managed by the management unit using generative AI. For example, the analysis unit compares past data with current data to predict crop growth patterns and issues disease warnings when abnormal data is detected.

Step 4: The provision unit provides optimal crop management advice based on the analysis results obtained by the analysis unit. For example, the provision unit uses generative AI to advise on the optimal timing of fertilization and the amount of watering for crop growth, and advises on measures for disease prevention in crops.

The specific processing unit 290 sends the results of specific processing to the smart device 14. In the smart device 14, the control unit 46A causes the output device 40 to output the results of specific processing. The microphone 38B acquires voice indicating user input in response to the results of specific processing. The control unit 46A sends the voice data indicating user input acquired by the microphone 38B to the data processing device 12. In the data processing device 12, the specific processing unit 290 acquires the voice data.

The data generation model 58 is a so-called generative AI (Artificial Intelligence). An example of the data generation model 58 is a generative AI such as ChatGPT (registered trademark) (Internet search <URL: https://openai.com/blog/chatgpt>). The data generation model 58 is obtained by performing deep learning on a neural network. The data generation model 58 receives prompts containing instructions and inference data such as voice data indicating voice, text data indicating text, and image data indicating images (e.g., still image data or video data). The data generation model 58 performs inference according to the instructions indicated by the prompt on the input inference data and outputs the inference results in one or more data formats such as voice data, text data, or image data. The data generation model 58 includes, for example, text generation AI, image generation AI, and multimodal generation AI. Here, inference refers to, for example, analysis, classification, prediction, and/or summarization. The specific processing unit 290 performs the specific processing described above using the data generation model 58. The data generation model 58 may be a fine-tuned model that outputs inference results from prompts without instructions, and in this case, the data generation model 58 can output inference results from prompts without instructions. The data processing device 12 and the like may include multiple types of data generation models 58, and the data generation model 58 may include AI other than generative AI. AI other than generative AI may include, for example, linear regression, logistic regression, decision trees, random forests, support vector machines (SVM), k-means clustering, convolutional neural networks (CNN), recurrent neural networks (RNN), generative adversarial networks (GAN), or naive Bayes, among others, and can perform various processing but are not limited to such examples. Additionally, AI may be an AI agent. Furthermore, when processing is performed by AI in each part described above, the processing may be performed partially or entirely by AI but is not limited to such examples. Additionally, processing implemented by AI including generative AI may be replaced with rule-based processing, and rule-based processing may be replaced with processing implemented by AI including generative AI.

Moreover, the processing by the data processing system 10 described above is executed by the specific processing unit 290 of the data processing device 12 or the control unit 46A of the smart device 14, but it may be executed by both the specific processing unit 290 of the data processing device 12 and the control unit 46A of the smart device 14. Additionally, the specific processing unit 290 of the data processing device 12 acquires or collects necessary information for processing from the smart device 14 or external devices, and the smart device 14 acquires or collects necessary information for processing from the data processing device 12 or external devices.

Each of the above-described elements, including the collection unit, management unit, analysis unit, and provision unit, is implemented by at least one of, for example, the smart device 14 and the data processing apparatus 12. For example, the collection unit collects environmental data such as soil moisture and temperature using sensors of the smart device 14. The management unit, for example, transmits the collected data to a cloud database and centrally manages it by a specific processing unit 290 of the data processing apparatus 12. The analysis unit, for example, analyzes the data using generative AI by the specific processing unit 290 of the data processing apparatus 12, and performs crop growth prediction and disease warning. The provision unit, for example, provides crop management advice based on the analysis results by the control unit 46A of the smart device 14. The collection unit, for example, can input user emotion data into generative AI and have the generative AI adjust the timing of data collection. The correspondence between each unit and the device or control unit is not limited to the above examples and various modifications are possible.

Second Embodiment

Figure 3:
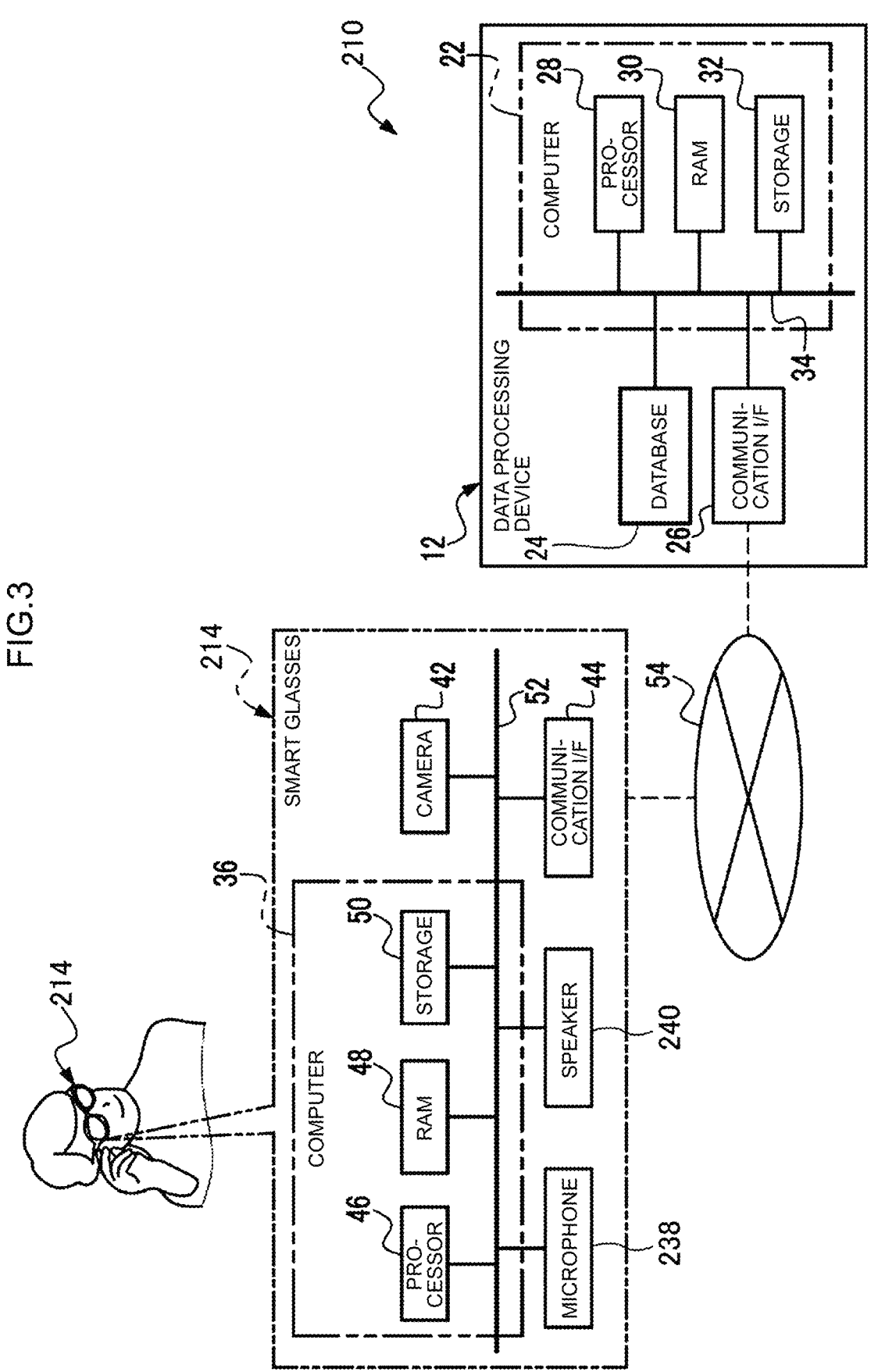
FIG. 3 is a conceptual diagram showing an example configuration of a data processing system according to the second embodiment.

FIG. 3 shows an example configuration of a data processing system 210 according to the second embodiment.

As shown in FIG. 3, the data processing system 210 comprises a data processing device 12 and smart glasses 214. An example of the data processing device 12 is a server.

The data processing device 12 comprises a computer 22, a database 24, and a communication I/F 26. The computer 22 comprises a processor 28, RAM 30, and storage 32. The processor 28, RAM 30, and storage 32 are connected to a bus 34. Additionally, the database 24 and communication I/F 26 are also connected to the bus 34. The communication I/F 26 is connected to a network 54. Examples of the network 54 include a WAN and/or a LAN, among others.

The smart glasses 214 comprise a computer 36, a microphone 238, a speaker 240, a camera 42, and a communication I/F 44. The computer 36 comprises a processor 46, RAM 48, and storage 50. The processor 46, RAM 48, and storage 50 are connected to a bus 52. The microphone 238, speaker 240, and camera 42 are also connected to the bus 52.

The microphone 238 accepts voice from the user, accepting instructions, among others, from the user. The microphone 238 captures the voice emitted by the user, converts the captured voice into voice data, and outputs it to the processor 46. The speaker 240 outputs sound according to instructions from the processor 46.

The camera 42 is a small digital camera equipped with optical systems such as lenses, apertures, and shutters, as well as imaging elements such as CMOS (Complementary Metal-Oxide-Semiconductor) image sensors or CCD (Charge Coupled Device) image sensors, and captures the surroundings of the user (e.g., an imaging range defined by an angle of view equivalent to the typical field of view of a healthy person).

The communication I/F 44 is connected to the network 54. The communication I/F 44 and 26 manage the exchange of various information between the processor 46 and the processor 28 via the network 54. The exchange of various information between the processor 46 and the processor 28 using the communication I/F 44 and 26 is conducted securely.

Figure 4:
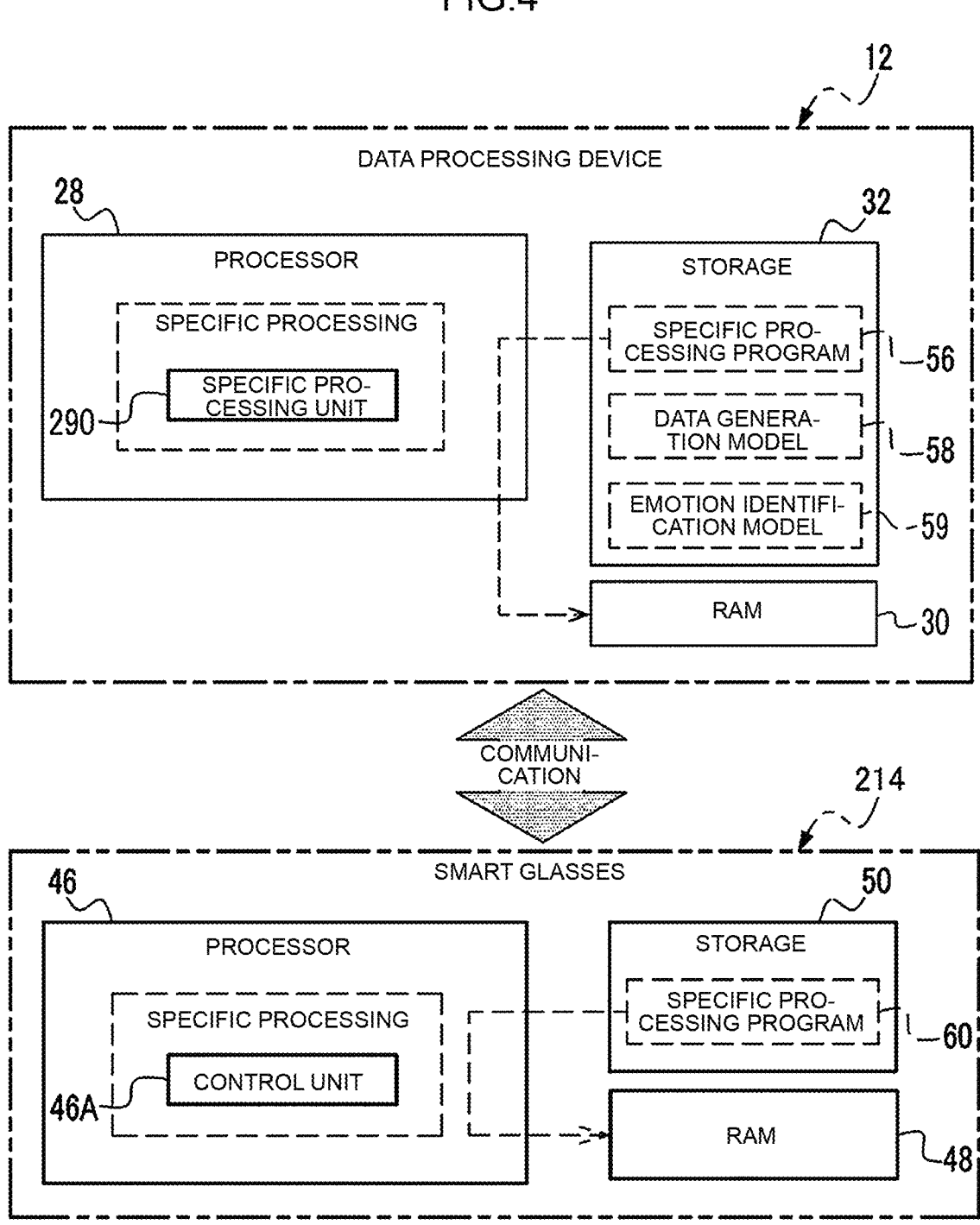
FIG. 4 is a conceptual diagram showing an example of main functions of a data processing device and smart glasses according to the second embodiment.

FIG. 4 shows an example of the main functions of the data processing device 12 and smart glasses 214. As shown in FIG. 4, specific processing is performed in the data processing device 12 by the processor 28. The storage 32 stores a specific processing program 56.

The processor 28 reads the specific processing program 56 from the storage 32 and executes it on the RAM 30. The specific processing is realized by the processor 28 operating as a specific processing unit 290 according to the specific processing program 56 executed on the RAM 30.

The storage 32 stores a data generation model 58 and an emotion identification model 59. The data generation model 58 and emotion identification model 59 are used by the specific processing unit 290. The specific processing unit 290 can estimate the user's emotions using the emotion identification model 59 and perform specific processing using the user's emotions. The emotion estimation function (emotion identification function) using the emotion identification model 59 includes estimating and predicting the user's emotions, but is not limited to such examples. Furthermore, emotion estimation and prediction may include, for example, emotion analysis.

In the smart glasses 214, specific processing is performed by the processor 46. The storage 50 stores a specific processing program 60. The processor 46 reads the specific processing program 60 from the storage 50 and executes it on the RAM 48. The specific processing is realized by the processor 46 operating as a control unit 46A according to the specific processing program 60 executed on the RAM 48. The smart glasses 214 may also have similar data generation models and emotion identification models as the data generation model 58 and emotion identification model 59, and perform the same processing as the specific processing unit 290 using these models.

Other devices besides the data processing device 12 may have the data generation model 58. For example, a server device may have the data generation model 58. In this case, the data processing device 12 communicates with the server device having the data generation model 58 to obtain processing results (e.g., prediction results) using the data generation model 58. The data processing device 12 may be a server device or a terminal device owned by the user (e.g., a mobile phone, robot, home appliance, etc.).

The specific processing unit 290 sends the results of specific processing to the smart glasses 214. In the smart glasses 214, the control unit 46A causes the speaker 240 to output the results of specific processing. The microphone 238 acquires voice indicating user input in response to the results of specific processing. The control unit 46A sends the voice data indicating user input acquired by the microphone 238 to the data processing device 12. In the data processing device 12, the specific processing unit 290 acquires the voice data.

The data generation model 58 is a so-called generative AI. An example of the data generation model 58 is a generative AI such as ChatGPT. The data generation model 58 is obtained by performing deep learning on a neural network. The data generation model 58 receives prompts containing instructions and inference data such as voice data indicating voice, text data indicating text, and image data indicating images (e.g., still image data or video data). The data generation model 58 performs inference according to the instructions indicated by the prompt on the input inference data and outputs the inference results in one or more data formats such as voice data, text data, or image data. The data generation model 58 includes, for example, text generation AI, image generation AI, and multimodal generation AI. Here, inference refers to, for example, analysis, classification, prediction, and/or summarization. The specific processing unit 290 performs the specific processing described above using the data generation model 58. The data generation model 58 may be a fine-tuned model that outputs inference results from prompts without instructions, and in this case, the data generation model 58 can output inference results from prompts without instructions. The data processing device 12 and the like may include multiple types of data generation models 58, and the data generation model 58 may include AI other than generative AI. AI other than generative AI may include, for example, linear regression, logistic regression, decision trees, random forests, support vector machines (SVM), k-means clustering, convolutional neural networks (CNN), recurrent neural networks (RNN), generative adversarial networks (GAN), or naive Bayes, among others, and can perform various processing but are not limited to such examples. Additionally, AI may be an AI agent. Furthermore, when processing is performed by AI in each part described above, the processing may be performed partially or entirely by AI but is not limited to such examples. Additionally, processing implemented by AI including generative AI may be replaced with rule-based processing, and rule-based processing may be replaced with processing implemented by AI including generative AI.

The data processing system 210 according to the second embodiment performs the same processing as the data processing system 10 according to the first embodiment. The processing by the data processing system 210 is executed by the specific processing unit 290 of the data processing device 12 or the control unit 46A of the smart glasses 214, but it may be executed by both the specific processing unit 290 of the data processing device 12 and the control unit 46A of the smart glasses 214. Additionally, the specific processing unit 290 of the data processing device 12 acquires or collects necessary information for processing from the smart glasses 214 or external devices, and the smart glasses 214 acquires or collects necessary information for processing from the data processing device 12 or external devices.

Each of the above-described elements, including the collection unit, management unit, analysis unit, and provision unit, is implemented by at least one of, for example, the smart glasses 214 and the data processing apparatus 12. For example, the collection unit collects environmental data such as soil moisture and temperature using sensors of the smart glasses 214. The management unit, for example, transmits the collected data to a cloud database and centrally manages it by a specific processing unit 290 of the data processing apparatus 12. The analysis unit, for example, analyzes the data using generative AI by the specific processing unit 290 of the data processing apparatus 12, and performs crop growth prediction and disease warning. The provision unit, for example, provides crop management advice based on the analysis results by the control unit 46A of the smart glasses 214. The collection unit, for example, can input user emotion data into generative AI and have the generative AI adjust the timing of data collection. The correspondence between each unit and the device or control unit is not limited to the above examples and various modifications are possible.

Third Embodiment

Figure 5:
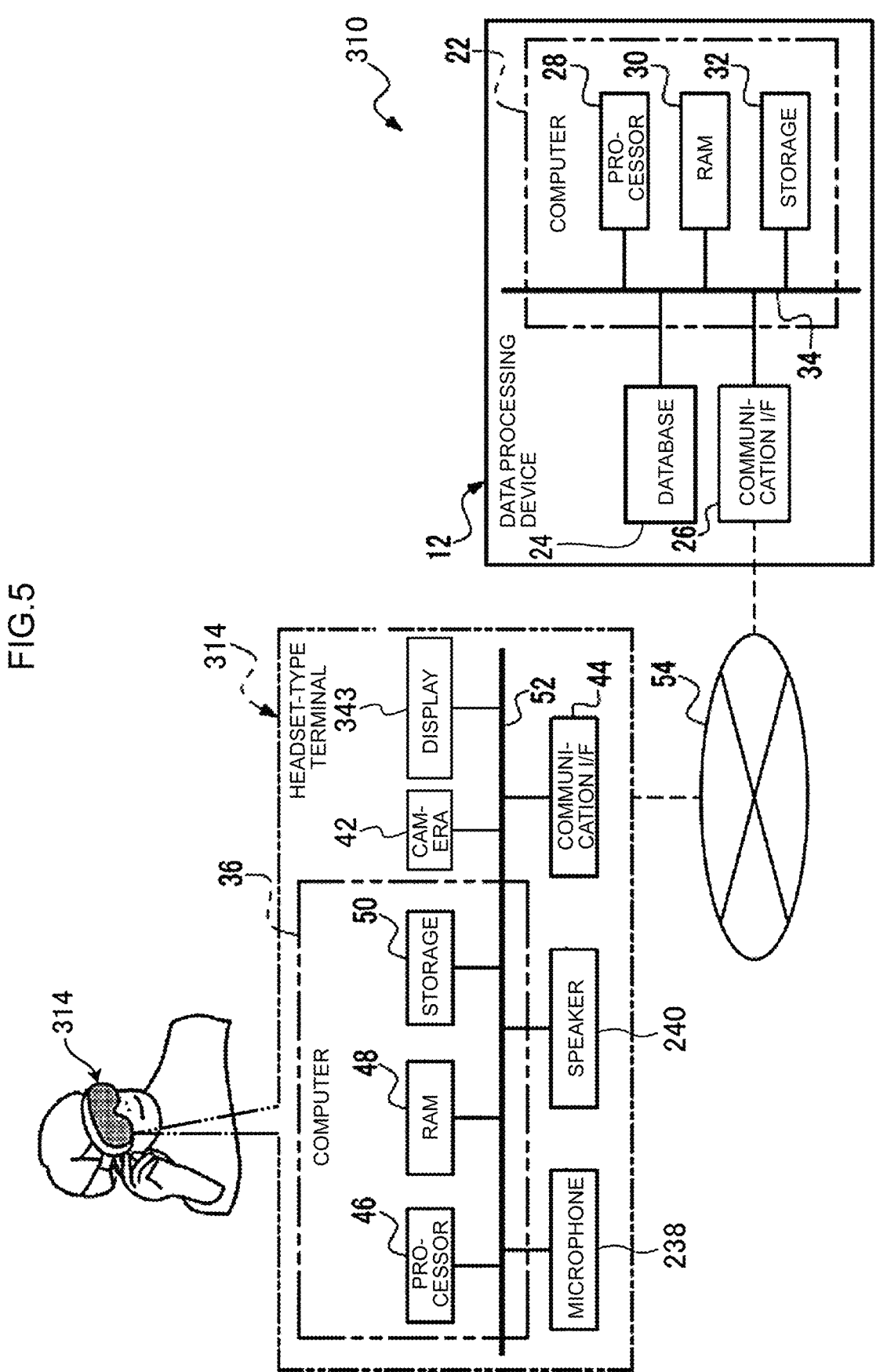
FIG. 5 is a conceptual diagram showing an example configuration of a data processing system according to the third embodiment.

FIG. 5 shows an example configuration of a data processing system 310 according to the third embodiment.

As shown in FIG. 5, the data processing system 310 comprises a data processing device 12 and a headset-type terminal 314. An example of the data processing device 12 is a server.

The data processing device 12 comprises a computer 22, a database 24, and a communication I/F 26. The computer 22 comprises a processor 28, RAM 30, and storage 32. The processor 28, RAM 30, and storage 32 are connected to a bus 34. Additionally, the database 24 and communication I/F 26 are also connected to the bus 34. The communication I/F 26 is connected to a network 54. Examples of the network 54 include a WAN and/or a LAN, among others.

The headset-type terminal 314 comprises a computer 36, a microphone 238, a speaker 240, a camera 42, a communication I/F 44, and a display 343. The computer 36 comprises a processor 46, RAM 48, and storage 50. The processor 46, RAM 48, and storage 50 are connected to a bus 52. The microphone 238, speaker 240, camera 42, and display 343 are also connected to the bus 52.

The microphone 238 accepts voice from the user, accepting instructions, among others, from the user. The microphone 238 captures the voice emitted by the user, converts the captured voice into voice data, and outputs it to the processor 46. The speaker 240 outputs sound according to instructions from the processor 46.

The camera 42 is a small digital camera equipped with optical systems such as lenses, apertures, and shutters, as well as imaging elements such as CMOS (Complementary Metal-Oxide-Semiconductor) image sensors or CCD (Charge Coupled Device) image sensors, and captures the surroundings of the user (e.g., an imaging range defined by an angle of view equivalent to the typical field of view of a healthy person).

The communication I/F 44 is connected to the network 54. The communication I/F 44 and 26 manage the exchange of various information between the processor 46 and the processor 28 via the network 54. The exchange of various information between the processor 46 and the processor 28 using the communication I/F 44 and 26 is conducted securely.

Figure 6:
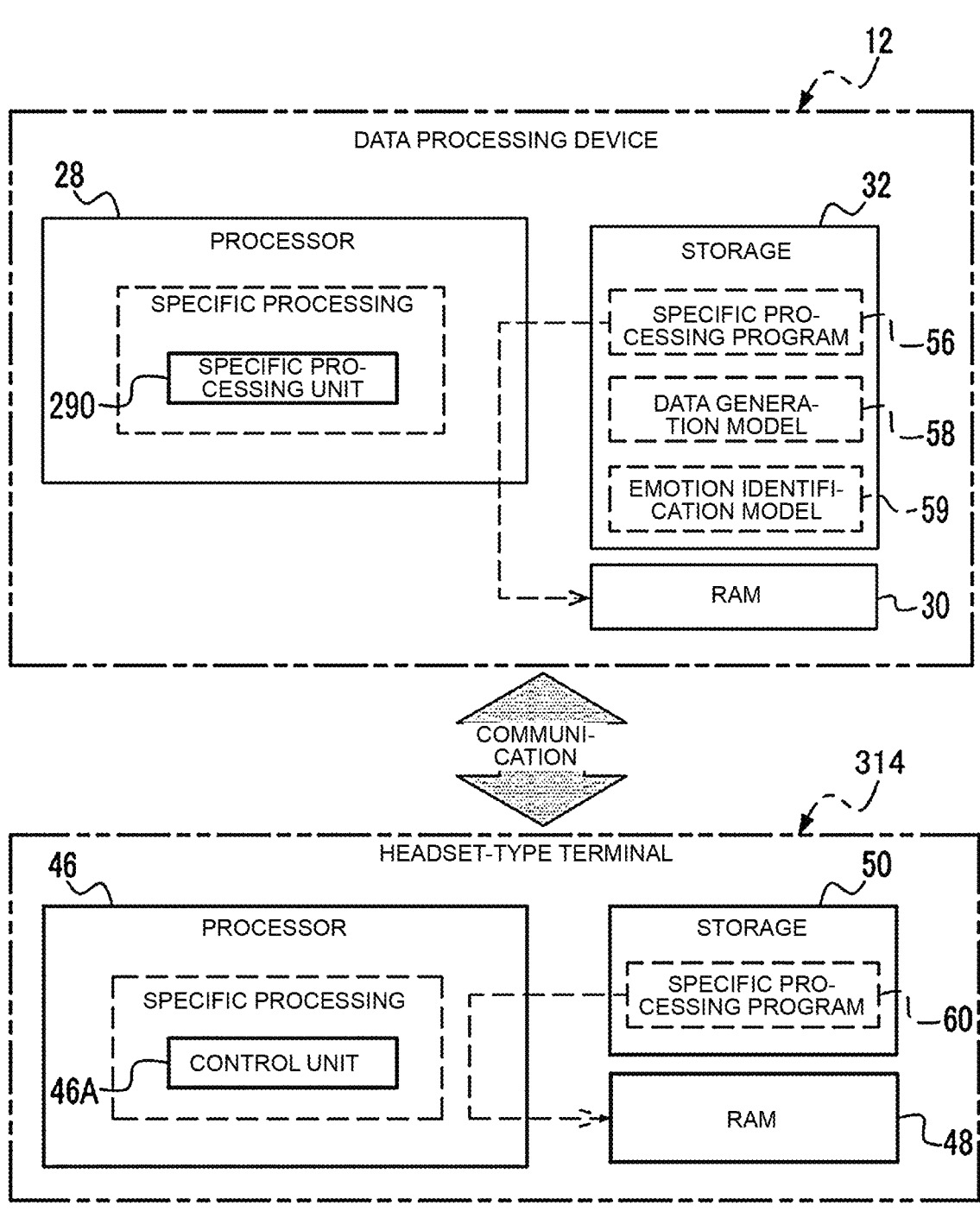
FIG. 6 is a conceptual diagram showing an example of main functions of a data processing device and a headset-type terminal according to the third embodiment.

FIG. 6 shows an example of the main functions of the data processing device 12 and the headset-type terminal 314. As shown in FIG. 6, specific processing is performed in the data processing device 12 by the processor 28. The storage 32 stores a specific processing program 56.

The processor 28 reads the specific processing program 56 from the storage 32 and executes it on the RAM 30. The specific processing is realized by the processor 28 operating as a specific processing unit 290 according to the specific processing program 56 executed on the RAM 30.

The storage 32 stores a data generation model 58 and an emotion identification model 59. The data generation model 58 and emotion identification model 59 are used by the specific processing unit 290. The specific processing unit 290 can estimate the user's emotions using the emotion identification model 59 and perform specific processing using the user's emotions. The emotion estimation function (emotion identification function) using the emotion identification model 59 includes estimating and predicting the user's emotions, but is not limited to such examples. Furthermore, emotion estimation and prediction may include, for example, emotion analysis.

In the headset-type terminal 314, specific processing is performed by the processor 46. The storage 50 stores a specific program 60. The processor 46 reads the specific program 60 from the storage 50 and executes it on the RAM 48. The specific processing is realized by the processor 46 operating as a control unit 46A according to the specific program 60 executed on the RAM 48. The headset-type terminal 314 may also have similar data generation models and emotion identification models as the data generation model 58 and emotion identification model 59, and perform the same processing as the specific processing unit 290 using these models.

Other devices besides the data processing device 12 may have the data generation model 58. For example, a server device may have the data generation model 58. In this case, the data processing device 12 communicates with the server device having the data generation model 58 to obtain processing results (e.g., prediction results) using the data generation model 58. The data processing device 12 may be a server device or a terminal device owned by the user (e.g., a mobile phone, robot, home appliance, etc.).

The specific processing unit 290 sends the results of specific processing to the headset-type terminal 314. In the headset-type terminal 314, the control unit 46A causes the speaker 240 and the display 343 to output the results of specific processing. The microphone 238 acquires voice indicating user input in response to the results of specific processing. The control unit 46A sends the voice data indicating user input acquired by the microphone 238 to the data processing device 12. In the data processing device 12, the specific processing unit 290 acquires the voice data.

The data generation model 58 is a so-called generative AI. An example of the data generation model 58 is a generative AI such as ChatGPT. The data generation model 58 is obtained by performing deep learning on a neural network. The data generation model 58 receives prompts containing instructions and inference data such as voice data indicating voice, text data indicating text, and image data indicating images (e.g., still image data or video data). The data generation model 58 performs inference according to the instructions indicated by the prompt on the input inference data and outputs the inference results in one or more data formats such as voice data, text data, or image data. The data generation model 58 includes, for example, text generation AI, image generation AI, and multimodal generation AI. Here, inference refers to, for example, analysis, classification, prediction, and/or summarization. The specific processing unit 290 performs the specific processing described above using the data generation model 58. The data generation model 58 may be a fine-tuned model that outputs inference results from prompts without instructions, and in this case, the data generation model 58 can output inference results from prompts without instructions. The data processing device 12 and the like may include multiple types of data generation models 58, and the data generation model 58 may include AI other than generative AI. AI other than generative AI may include, for example, linear regression, logistic regression, decision trees, random forests, support vector machines (SVM), k-means clustering, convolutional neural networks (CNN), recurrent neural networks (RNN), generative adversarial networks (GAN), or naive Bayes, among others, and can perform various processing but are not limited to such examples. Additionally, AI may be an AI agent. Furthermore, when processing is performed by AI in each part described above, the processing may be performed partially or entirely by AI but is not limited to such examples. Additionally, processing implemented by AI including generative AI may be replaced with rule-based processing, and rule-based processing may be replaced with processing implemented by AI including generative AI.

The data processing system 310 according to the third embodiment performs the same processing as the data processing system 10 according to the first embodiment. The processing by the data processing system 310 is executed by the specific processing unit 290 of the data processing device 12 or the control unit 46A of the headset-type terminal 314, but it may be executed by both the specific processing unit 290 of the data processing device 12 and the control unit 46A of the headset-type terminal 314. Additionally, the specific processing unit 290 of the data processing device 12 acquires or collects necessary information for processing from the headset-type terminal 314 or external devices, and the headset-type terminal 314 acquires or collects necessary information for processing from the data processing device 12 or external devices.

Each of the above-described elements, including the collection unit, management unit, analysis unit, and provision unit, is implemented by at least one of, for example, the headset-type terminal 314 and the data processing apparatus 12. For example, the collection unit collects environmental data such as soil moisture and temperature using sensors of the headset-type terminal 314. The management unit, for example, transmits the collected data to a cloud database and centrally manages it by a specific processing unit 290 of the data processing apparatus 12. The analysis unit, for example, analyzes the data using generative AI by the specific processing unit 290 of the data processing apparatus 12, and performs crop growth prediction and disease warning. The provision unit, for example, provides crop management advice based on the analysis results by the control unit 46A of the headset-type terminal 314. The collection unit, for example, can input user emotion data into generative AI and have the generative AI adjust the timing of data collection. The correspondence between each unit and the device or control unit is not limited to the above examples and various modifications are possible.

Fourth Embodiment

Figure 7:
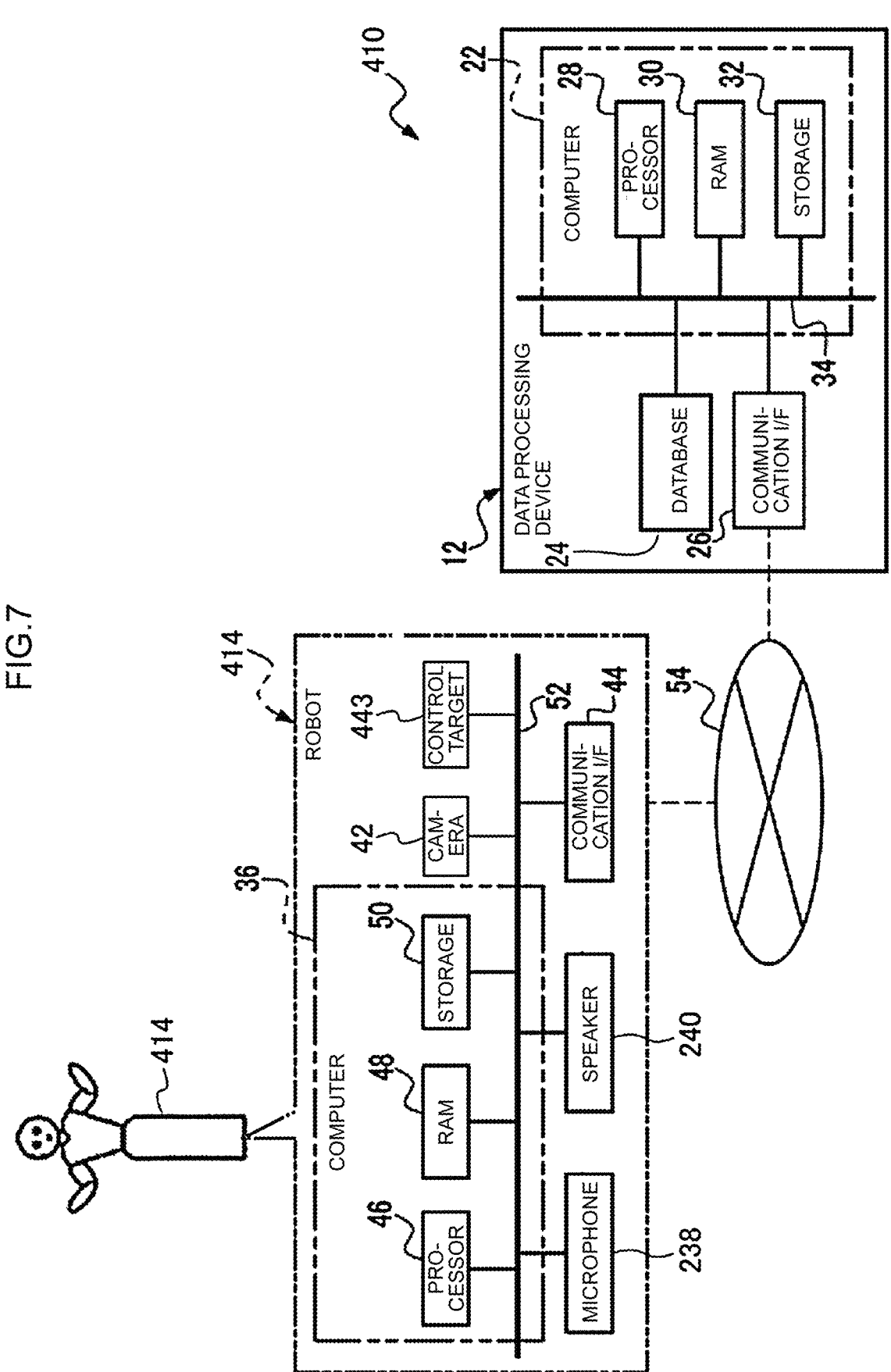
FIG. 7 is a conceptual diagram showing an example configuration of a data processing system according to the fourth embodiment.

FIG. 7 shows an example configuration of a data processing system 410 according to the fourth embodiment. As shown in FIG. 7, the data processing system 410 comprises a data processing device 12 and a robot 414. An example of the data processing device 12 is a server.

The data processing device 12 comprises a computer 22, a database 24, and a communication I/F 26. The computer 22 comprises a processor 28, RAM 30, and storage 32. The processor 28, RAM 30, and storage 32 are connected to a bus 34. Additionally, the database 24 and communication I/F 26 are also connected to the bus 34. The communication I/F 26 is connected to a network 54. Examples of the network 54 include a WAN and/or a LAN, among others.

The robot 414 comprises a computer 36, a microphone 238, a speaker 240, a camera 42, a communication I/F 44, and a control target 443. The computer 36 comprises a processor 46, RAM 48, and storage 50. The processor 46, RAM 48, and storage 50 are connected to a bus 52. The microphone 238, speaker 240, camera 42, and control target 443 are also connected to the bus 52.

The microphone 238 accepts voice from the user, accepting instructions, among others, from the user. The microphone 238 captures the voice emitted by the user, converts the captured voice into voice data, and outputs it to the processor 46. The speaker 240 outputs sound according to instructions from the processor 46.

The camera 42 is a small digital camera equipped with optical systems such as lenses, apertures, and shutters, as well as imaging elements such as CMOS image sensors or CCD image sensors, and captures the surroundings of the user (e.g., an imaging range defined by an angle of view equivalent to the typical field of view of a healthy person).

The communication I/F 44 is connected to the network 54. The communication I/F 44 and 26 manage the exchange of various information between the processor 46 and the processor 28 via the network 54. The exchange of various information between the processor 46 and the processor 28 using the communication I/F 44 and 26 is conducted securely.

The control target 443 includes a display device, LEDs for the eyes, and motors for driving arms, hands, and feet, among others. The posture and gestures of the robot 414 are controlled by controlling the motors for the arms, hands, and feet, among others. Some emotions of the robot 414 can be expressed by controlling these motors. Additionally, the expression of the robot 414 can be expressed by controlling the lighting state of the LEDs for the eyes of the robot 414.

Figure 8:
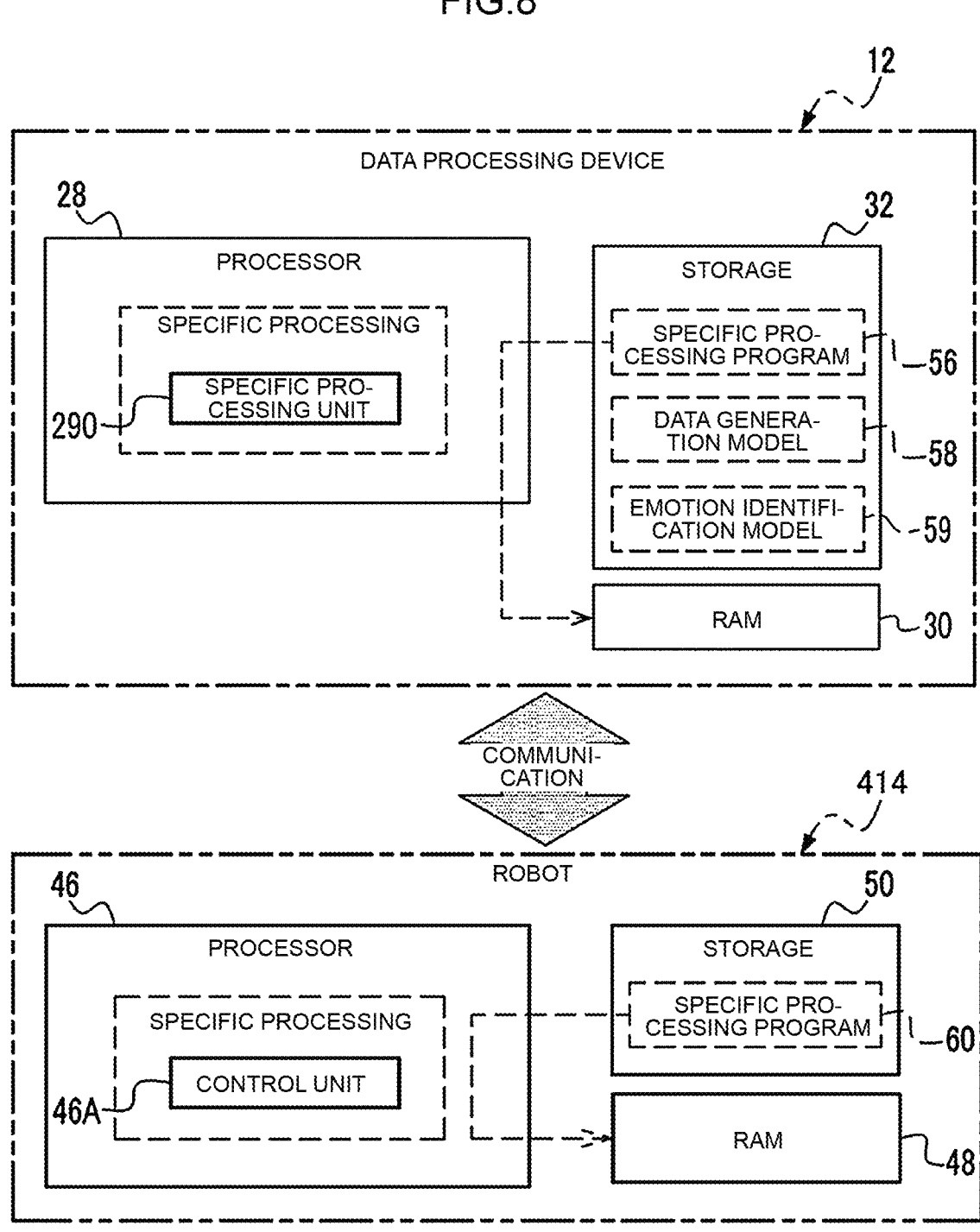
FIG. 8 is a conceptual diagram showing an example of main functions of a data processing device and a robot according to the fourth embodiment.

FIG. 8 shows an example of the main functions of the data processing device 12 and the robot 414. As shown in FIG. 8, specific processing is performed in the data processing device 12 by the processor 28. The storage 32 stores a specific processing program 56.

The processor 28 reads the specific processing program 56 from the storage 32 and executes it on the RAM 30. The specific processing is realized by the processor 28 operating as a specific processing unit 290 according to the specific processing program 56 executed on the RAM 30.

The storage 32 stores a data generation model 58 and an emotion identification model 59. The data generation model 58 and emotion identification model 59 are used by the specific processing unit 290. The specific processing unit 290 can estimate the user's emotions using the emotion identification model 59 and perform specific processing using the user's emotions. The emotion estimation function (emotion identification function) using the emotion identification model 59 includes estimating and predicting the user's emotions, but is not limited to such examples. Furthermore, emotion estimation and prediction may include, for example, emotion analysis.

In the robot 414, specific processing is performed by the processor 46. The storage 50 stores a specific program 60. The processor 46 reads the specific program 60 from the storage 50 and executes it on the RAM 48. The specific processing is realized by the processor 46 operating as a control unit 46A according to the specific program 60 executed on the RAM 48. The robot 414 may also have similar data generation models and emotion identification models as the data generation model 58 and emotion identification model 59, and perform the same processing as the specific processing unit 290 using these models.

Other devices besides the data processing device 12 may have the data generation model 58. For example, a server device may have the data generation model 58. In this case, the data processing device 12 communicates with the server device having the data generation model 58 to obtain processing results (e.g., prediction results) using the data generation model 58. The data processing device 12 may be a server device or a terminal device owned by the user (e.g., a mobile phone, robot, home appliance, etc.).

The specific processing unit 290 sends the results of specific processing to the robot 414. In the robot 414, the control unit 46A causes the speaker 240 and the control target 443 to output the results of specific processing. The microphone 238 acquires voice indicating user input in response to the results of specific processing. The control unit 46A sends the voice data indicating user input acquired by the microphone 238 to the data processing device 12. In the data processing device 12, the specific processing unit 290 acquires the voice data.

The data generation model 58 is a so-called generative AI. An example of the data generation model 58 is a generative AI such as ChatGPT. The data generation model 58 is obtained by performing deep learning on a neural network. The data generation model 58 receives prompts containing instructions and inference data such as voice data indicating voice, text data indicating text, and image data indicating images (e.g., still image data or video data). The data generation model 58 performs inference according to the instructions indicated by the prompt on the input inference data and outputs the inference results in one or more data formats such as voice data, text data, or image data. The data generation model 58 includes, for example, text generation AI, image generation AI, and multimodal generation AI. Here, inference refers to, for example, analysis, classification, prediction, and/or summarization. The specific processing unit 290 performs the specific processing described above using the data generation model 58. The data generation model 58 may be a fine-tuned model that outputs inference results from prompts without instructions, and in this case, the data generation model 58 can output inference results from prompts without instructions. The data processing device 12 and the like may include multiple types of data generation models 58, and the data generation model 58 may include AI other than generative AI. AI other than generative AI may include, for example, linear regression, logistic regression, decision trees, random forests, support vector machines (SVM), k-means clustering, convolutional neural networks (CNN), recurrent neural networks (RNN), generative adversarial networks (GAN), or naive Bayes, among others, and can perform various processing but are not limited to such examples. Additionally, AI may be an AI agent. Furthermore, when processing is performed by AI in each part described above, the processing may be performed partially or entirely by AI but is not limited to such examples. Additionally, processing implemented by AI including generative AI may be replaced with rule-based processing, and rule-based processing may be replaced with processing implemented by AI including generative AI.

The data processing system 410 according to the fourth embodiment performs the same processing as the data processing system 10 according to the first embodiment. The processing by the data processing system 410 is executed by the specific processing unit 290 of the data processing device 12 or the control unit 46A of the robot 414, but it may be executed by both the specific processing unit 290 of the data processing device 12 and the control unit 46A of the robot 414. Additionally, the specific processing unit 290 of the data processing device 12 acquires or collects necessary information for processing from the robot 414 or external devices, and the robot 414 acquires or collects necessary information for processing from the data processing device 12 or external devices.

Each of the above-described elements, including the collection unit, management unit, analysis unit, and provision unit, is implemented by at least one of, for example, the robot 414 and the data processing apparatus 12. For example, the collection unit collects environmental data such as soil moisture and temperature using sensors of the robot 414. The management unit, for example, transmits the collected data to a cloud database and centrally manages it by a specific processing unit 290 of the data processing apparatus 12. The analysis unit, for example, analyzes the data using generative AI by the specific processing unit 290 of the data processing apparatus 12, and performs crop growth prediction and disease warning. The provision unit, for example, provides crop management advice based on the analysis results by the control unit 46A of the robot 414. The collection unit, for example, can input user emotion data into generative AI and have the generative AI adjust the timing of data collection. The correspondence between each unit and the device or control unit is not limited to the above examples and various modifications are possible.

Note that the emotion identification model 59 as an emotion engine may determine the user's emotions according to a specific mapping. Specifically, the emotion identification model 59 may determine the user's emotions according to an emotion map, which is a specific mapping (see FIG. 9). Similarly, the emotion identification model 59 may determine the robot's emotions, and the specific processing unit 290 may perform specific processing using the robot's emotions.

Figure 9:
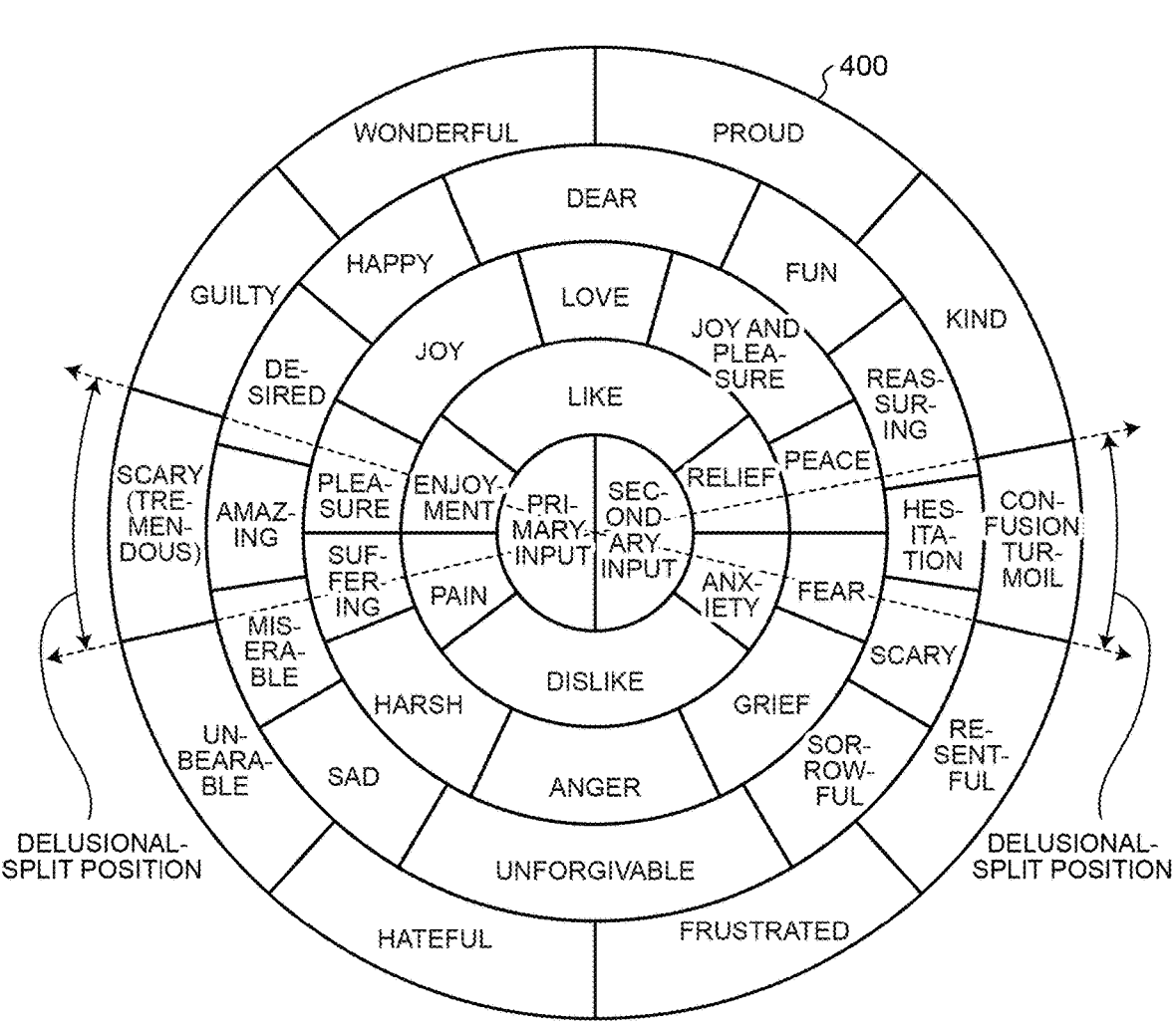
FIG. 9 shows an emotion map where multiple emotions are mapped.

FIG. 9 is a diagram showing an emotion map 400 where multiple emotions are mapped. In the emotion map 400, emotions are arranged concentrically radiating from the center. The closer to the center of the concentric circles, the more primitive the state of emotions is arranged. On the outer side of the concentric circles, emotions representing states and behaviors arising from mood are arranged. Emotions encompass concepts including emotional and mental states. On the left side of the concentric circles, emotions generally generated from reactions occurring in the brain are arranged. On the right side of the concentric circles, emotions generally induced by situational judgment are arranged. On the top and bottom of the concentric circles, emotions generated from reactions occurring in the brain and induced by situational judgment are arranged. Additionally, on the upper side of the concentric circles, "pleasant" emotions are arranged, and on the lower side, "unpleasant" emotions are arranged. In this way, in the emotion map 400, multiple emotions are mapped based on the structure from which emotions arise, and emotions that tend to occur simultaneously are mapped nearby.

These emotions are distributed in the 3 o'clock direction of the emotion map 400, and they usually move back and forth around reassurance and anxiety. In the right half of the emotion map 400, situational recognition takes precedence over internal sensations, giving a calm impression.

The inner side of the emotion map 400 represents the mind, and the outer side represents behavior, so the further out on the emotion map 400, the more visible (expressed in behavior) emotions become.

Here, human emotions are based on various balances like posture and blood sugar levels, and when these balances move away from the ideal, they indicate discomfort, and when they approach the ideal, they indicate comfort. In robots, cars, motorcycles, etc., emotions can be created based on various balances like posture and battery level, indicating discomfort when these balances move away from the ideal and comfort when they approach the ideal. The emotion map may be generated based on Dr. Mitsuyoshi's emotion map (Research on speech emotion recognition and brain physiological signal analysis systems related to emotions, Tokushima University, Doctoral dissertation: https://ci.nii.ac.jp/naid/500000375379). In the left half of the emotion map, emotions belonging to the domain called "reactions," where sensations take precedence, are aligned. Additionally, in the right half of the emotion map, emotions belonging to the domain called "situations," where situational recognition takes precedence, are aligned.

In the emotion map, two emotions that promote learning are defined. One is a negative emotion around "repentance" or "reflection" on the situation side. In other words, when a negative emotion arises in the robot, like "I never want to feel this way again" or "I don't want to be scolded again." The other is an emotion around "desire" on the reaction side, which is positive. In other words, it is a positive feeling like "I want more" or "I want to know more."

Figure 10:
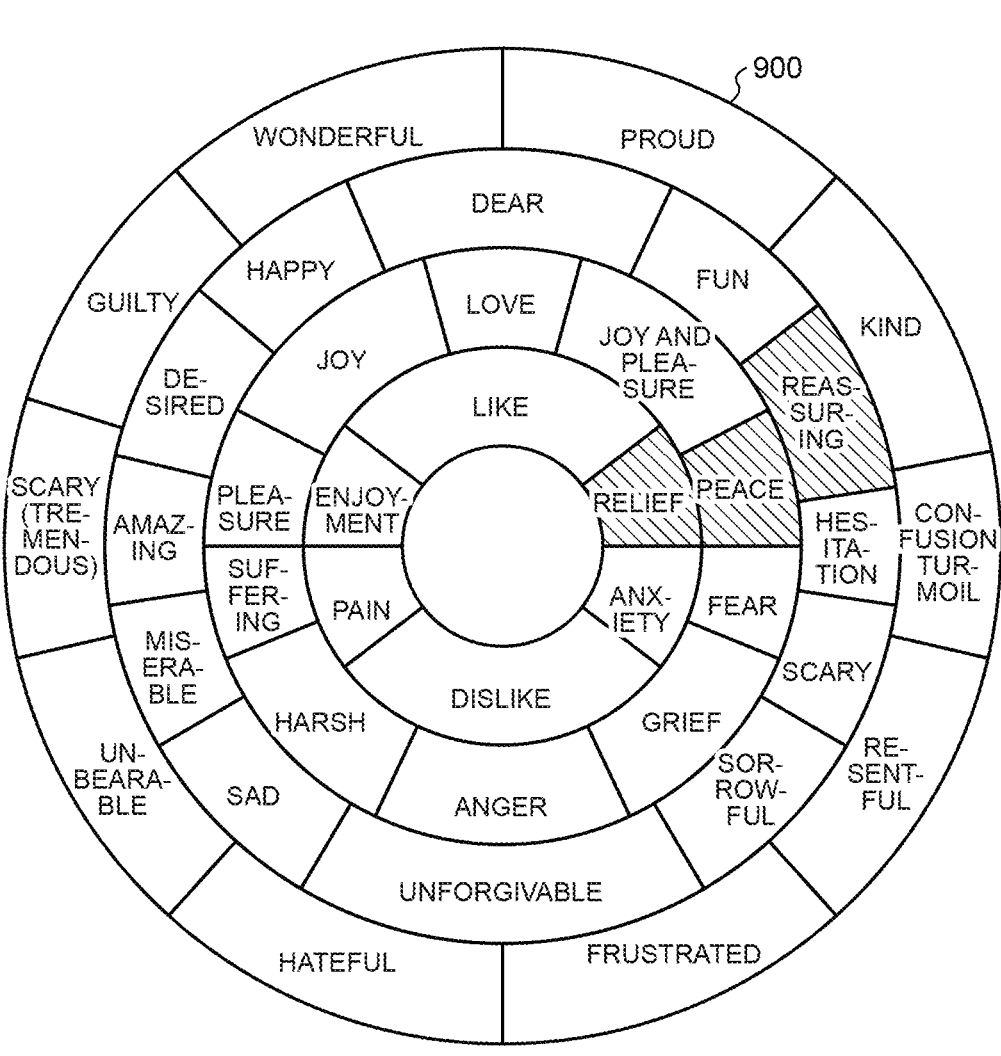
FIG. 10 shows an emotion map where multiple emotions are mapped.

The emotion identification model 59 inputs user input into a pre-learned neural network, acquires emotion values indicating each emotion shown in the emotion map 400, and determines the user's emotions. This neural network is pre-learned based on multiple training data consisting of user input and combinations of emotion values indicating each emotion shown in the emotion map 400. Additionally, this neural network is learned so that emotions placed near each other in the emotion map 900 shown in FIG. 10 have similar values. FIG. 10 shows an example where multiple emotions like "reassured," "calm," and "confident" have similar emotion values.

In the above embodiments, an example form where specific processing is performed by a single computer 22 was described, but the technology disclosed herein is not limited to this, and distributed processing for specific processing by multiple computers including the computer 22 may be performed.

In the above embodiments, an example form where the specific processing program 56 is stored in the storage 32 was described, but the technology disclosed herein is not limited to this. For example, the specific processing program 56 may be stored in portable non-transitory storage media readable by a computer, such as a USB (Universal Serial Bus) memory. The specific processing program 56 stored in non-transitory storage media is installed in the computer 22 of the data processing device 12. The processor 28 executes specific processing according to the specific processing program 56.

Additionally, the specific processing program 56 may be stored in a storage device, such as a server connected to the data processing device 12 via the network 54, and downloaded and installed on the computer 22 in response to requests from the data processing device 12.

Furthermore, it is not necessary to store all of the specific processing program 56 in storage devices such as servers connected to the data processing device 12 via the network 54 or all in the storage 32, and a part of the specific processing program 56 may be stored.

Various processors, as shown next, can be used as hardware resources for executing specific processing. As processors, general-purpose processors that function as hardware resources for executing specific processing by executing software, i.e., programs, such as a CPU, can be mentioned. Additionally, as processors, dedicated electrical circuits with circuit configurations specially designed to execute specific processing, such as FPGA (Field-Programmable Gate Array), PLD (Programmable Logic Device), or ASIC (Application Specific Integrated Circuit), can be mentioned. Each processor has a built-in or connected memory, and each processor executes specific processing using the memory.

Hardware resources for executing specific processing may be composed of one of these various processors or a combination of two or more processors of the same or different types (e.g., a combination of multiple FPGAs or a combination of a CPU and FPGA). Additionally, hardware resources for executing specific processing may be a single processor.

As an example of composing with a single processor, firstly, there is a form where one or more CPUs and software are combined to constitute a single processor, which functions as hardware resources for executing specific processing. Secondly, there is a form using a processor, such as SoC (System-on-a-chip), that realizes the function of an entire system including multiple hardware resources for executing specific processing with a single IC chip. In this way, specific processing is realized using one or more of the various processors as hardware resources.

Furthermore, as a hardware structure of these various processors, more specifically, electrical circuits combined with circuit elements such as semiconductor elements can be used. Additionally, the specific processing described above is merely one example. Therefore, it goes without saying that unnecessary steps may be deleted, new steps may be added, or the order of processing may be changed within the scope not departing from the gist.

Additionally, in the examples described above, the explanation was divided into the first embodiment to the fourth embodiment, but parts or all of these embodiments may be combined. Additionally, the smart device 14, smart glasses 214, headset-type terminal 314, and robot 414 are examples, and each may be combined, or other devices may be used. Additionally, the examples described above were explained by dividing into form example 1 and form example 2, but these may be combined.

The descriptions and drawings shown above are detailed explanations of parts related to the technology disclosed herein and are merely examples of the technology disclosed herein. For example, the explanations regarding configurations, functions, actions, and effects above are explanations regarding examples of configurations, functions, actions, and effects of parts related to the technology disclosed herein. Therefore, it goes without saying that within the scope not departing from the gist of the technology disclosed herein, unnecessary parts may be deleted, new elements may be added, or replacements may be made to the descriptions and drawings shown above. Additionally, to avoid complexity and facilitate understanding of parts related to the technology disclosed herein, explanations concerning technical common knowledge and the like that do not require special explanation for enabling the implementation of the technology disclosed herein are omitted in the descriptions and drawings shown above.

All documents, patent applications, and technical standards described in this specification are incorporated by reference to the same extent as if each document, patent application, and technical standard were specifically and individually stated to be incorporated by reference in this specification.

[Additional Note 1]

A system comprising: a collection unit that collects data; a management unit that centrally manages the data collected by the collection unit; an analysis unit that analyzes the data managed by the management unit; and a provision unit that provides advice based on the analysis results obtained by the analysis unit.

[Additional Note 2]

The system according to Additional Note 1, wherein the collection unit collects environmental data including soil moisture, temperature, amount of sunlight, soil pH value, and wind speed.

[Additional Note 3] The system according to Additional Note 1, wherein the management unit transmits the collected data to a cloud database and centrally manages the data.

[Additional Note 4]

The system according to Additional Note 1, wherein the management unit includes security measures and backup methods for the data.

[Additional Note 5]

The system according to Additional Note 1, wherein the analysis unit compares past data with current data and predicts crop growth patterns.

[Additional Note 6]

The system according to Additional Note 1, wherein the analysis unit issues a disease warning when abnormal data is detected.

[Additional Note 7]

The system according to Additional Note 1, wherein the provision unit provides crop management advice.

[Additional Note 8]

The system according to Additional Note 1, wherein the collection unit estimates the user's emotions and adjusts the timing of data collection based on the estimated emotions.

[Additional Note 9]

The system according to Additional Note 1, wherein the collection unit analyzes past collected data and selects a data collection method.

[Additional Note 10]

The system according to Additional Note 1, wherein the collection unit focuses on specific areas of the farm during data collection and collects detailed data.

[Additional Note 11]

The system according to Additional Note 1, wherein the collection unit estimates the user's emotions and determines the priority of data to be collected based on the estimated user's emotions.

[Additional Note 12]

The system according to Additional Note 1, wherein the collection unit prioritizes the collection of highly relevant data based on the geographical location information of the farm during data collection.

[Additional Note 13]

The system according to Additional Note 1, wherein the collection unit refers to the historical data of the farm during data collection to improve the accuracy of collection.

[Additional Note 14]

The system according to Additional Note 1, wherein the management unit estimates the user's emotions and adjusts the data management method based on the estimated emotions.

[Additional Note 15]

The system according to Additional Note 1, wherein the management unit refers to past management data during data management to select a management method.

[Additional Note 16]

The system according to Additional Note 1, wherein the management unit adjusts the level of detail in management according to the importance of the data during data management.

[Additional Note 17]

The system according to Additional Note 1, wherein the management unit estimates the user's emotions and determines the priority of data management based on the estimated user's emotions.

[Additional Note 18]

The system according to Additional Note 1, wherein the management unit determines the priority of management according to the submission timing of the data during data management.

[Additional Note 19]

The system according to Additional Note 1, wherein the management unit adjusts the order of management based on the relevance of the data during data management.

[Additional Note 20] The system according to Additional Note 1, wherein the analysis unit estimates the user's emotions and adjusts the analysis method based on the estimated emotions.

[Additional Note 21]

The system according to Additional Note 1, wherein the analysis unit refers to past analysis data during analysis to select the optimal analysis method.

[Additional Note 22]

The system according to Additional Note 1, wherein the analysis unit applies different analysis algorithms according to the type of data during analysis.

[Additional Note 23]

The system according to Additional Note 1, wherein the analysis unit estimates the user's emotions and determines the priority of analysis based on the estimated user's emotions.

[Additional Note 24]

The system according to Additional Note 1, wherein the analysis unit determines the priority of analysis according to the submission timing of the data during analysis.

[Additional Note 25]

The system according to Additional Note 1, wherein the analysis unit adjusts the order of analysis based on the relevance of the data during analysis.

[Additional Note 26]

The system according to Additional Note 1, wherein the provision unit estimates the user's emotions and adjusts the method of expressing advice based on the estimated emotions.

[Additional Note 27]

The system according to Additional Note 1, wherein the provision unit refers to past advice data during advice provision to select the optimal advice method.

[Additional Note 28]

The system according to Additional Note 1, wherein the provision unit adjusts the level of detail according to the importance of the advice during advice provision.

[Additional Note 29]

The system according to Additional Note 1, wherein the provision unit estimates the user's emotions and determines the priority of advice based on the estimated user's emotions.

[Additional Note 30]

The system according to Additional Note 1, wherein the provision unit determines the priority according to the submission timing of the advice during advice provision.

[Additional Note 31]

The system according to Additional Note 1, wherein the provision unit adjusts the order based on the relevance of the advice during advice provision.

What is claimed is:

1. A crop management system comprising:

a plurality of Internet of Things (IoT) devices installed on a farm and configured to collect environmental data including soil moisture data and temperature data;

a cloud database;

a communication interface;

an output device configured to output information to a user;

an irrigation unit configured to supply water to the farm;

a weather prediction unit configured to predict rainfall; and a data processing device including a processor and a memory storing a program, a data generation model, and an emotion identification model, wherein the data processing device is configured to receive the environmental data via the communication interface from the plurality of IoT devices, wherein the program, when executed by the processor, causes the processor to perform:

(i) a collection process in which the processor acquires the environmental data and sets collection parameters that include a data collection timing and a priority of data to be collected;

(ii) a management process in which the processor transmits the environmental data to the cloud database and centrally manages the environmental data in the cloud database;

(iii) an analysis process in which the processor analyzes the environmental data managed in the cloud database using the data generation model and outputs analysis results that include at least one of a crop growth prediction and a disease warning; and (iv) a provision process in which the processor generates crop management advice based on the analysis results and causes the output device to output the crop management advice, wherein the program, when executed by the processor, further causes the processor to estimate user's emotions using the emotion identification model, wherein the emotion identification model determines the user's emotions according to an emotion map in which multiple emotions are mapped, and based on the estimated user's emotions, the program causes the processor to control the provision process by adjusting at least one of (a) a priority of advice to be output as the crop management advice and (b) an amount of information included in the crop management advice, wherein the crop management advice includes at least one of an irrigation timing, a frequency of irrigation, or an optimal water amount determined based on the soil moisture data, and wherein the program, when executed by the processor, further causes the processor to control the irrigation unit, based on the soil moisture data, to:

(v) automatically determine at least one of the irrigation timing, the frequency of irrigation, or the optimal water amount based on the soil moisture data;

(vi) cause the irrigation unit to start supplying water when the soil moisture data indicates that soil moisture decreases, and supply water in accordance with the determined optimal water amount;

(vii) adjust at least one of the irrigation timing, the frequency of irrigation, or the optimal water amount according to a crop growth stage; and (viii) refrain from automatically performing irrigation in response to predicting rainfall by the weather prediction unit.

2. The crop management system according to claim 1, wherein, based on the estimated user's emotions, the program causes the processor to control the collection process by adjusting at least one of the data collection timing and the priority of data to be collected, and to control at least one of the provision process and the output device, such that the program causes the processor to reduce the frequency of data collection and send fewer notifications when the user is feeling stressed, to increase the frequency of data collection and provide detailed information when the user is relaxed, and to prioritize collection of only important data and send notifications quickly when the user is in a hurry.

3. The crop management system according to claim 1, wherein, based on the estimated user's emotions, the program causes the processor to determine the priority of data to be collected such that: when the user is feeling stressed, the processor prioritizes collection of the soil moisture data over the temperature data; when the user is relaxed, the processor prioritizes collection of both the soil moisture data and the temperature data; and when the user is in a hurry, the processor prioritizes collection of the soil moisture data and deprioritizes collection of the temperature data.

4. The crop management system according to claim 1, wherein, in the collection process, the program causes the processor to collect, as the environmental data, the soil moisture data and the temperature data for a specific area of the farm, and, in response to the analysis results including the disease warning for the specific area, increase a frequency of collecting the soil moisture data and the temperature data for the specific area.

5. The crop management system according to claim 1, wherein the emotion map arranges emotions concentrically, places more primitive emotions closer to a center of the emotion map, places "pleasant" emotions on one side of the emotion map, and places "unpleasant" emotions on another side of the emotion map.

6. The crop management system according to claim 1, wherein the emotion identification model inputs at least one of voice data and image data into a pre-learned neural network, acquires emotion values indicating each emotion mapped in the emotion map, and determines the user's emotions based on the emotion values.

7. The crop management system according to claim 1, wherein, in the management process, the program causes the processor to encrypt the environmental data, implement access control for the environmental data stored in the cloud database, regularly back up the environmental data stored in the cloud database, and perform recovery of the backed-up environmental data.

8. The crop management system according to claim 1, wherein, in the analysis process, the program causes the processor to compare past environmental data managed in the cloud database with current environmental data to output the crop growth prediction, and to output the disease warning based on comparing the past environmental data with the current environmental data.

9. The crop management system according to claim 1, wherein the crop management advice further includes a fertilization timing and disease prevention measures for crops.

10. The crop management system according to claim 1, wherein the weather prediction unit is configured to predict rainfall based on the environmental data.

11. The crop management system according to claim 1, wherein the program causes the processor to control the irrigation unit to automatically start irrigation when the soil moisture decreases, and to adjust a frequency of irrigation and a water amount according to a crop growth stage.

12. The crop management system according to claim 1, further comprising a pest detection unit configured to detect presence of pests on crops based on the environmental data and image data of the crops.

13. The crop management system according to claim 1, further comprising a harvest prediction unit configured to predict a harvest timing based on the environmental data and the crop growth prediction.

* * * * *